(12) United States Patent
Kumar

(10) Patent No.: US 12,341,832 B2
(45) Date of Patent: Jun. 24, 2025

(54) AUTOMATIC ADAPTIVE DIGITAL CONTENT GENERATION FOR COLLABORATIVE DOCUMENTS USING MACHINE-LEARNING-BASED DIGITAL CONTENT PROCESSING TECHNIQUES

(71) Applicants: ATLASSIAN PTY LTD., Sydney (AU); ATLASSIAN US, INC., San Francisco, CA (US)

(72) Inventor: Navneet Kumar, Sydney (AU)

(73) Assignees: ATLASSIAN PTY, LTD., Sydney (AU); ATLASSIAN US, INC., San Francisco, CA (US)

(*) Notice: Subject to any disclaimer, the term of this patent is extended or adjusted under 35 U.S.C. 154(b) by 363 days.

(21) Appl. No.: 18/147,871

(22) Filed: Dec. 29, 2022

(65) Prior Publication Data

US 2024/0223628 A1 Jul. 4, 2024

(51) Int. Cl.
*H04L 65/401* (2022.01)

(52) U.S. Cl.
CPC .................. *H04L 65/4015* (2013.01)

(58) Field of Classification Search
CPC ............ H04L 65/403; H04L 65/4015; H04L 12/1827; H04L 63/102; G06F 40/166; G06F 16/93; G06F 40/169; G06F 16/176; G06F 3/0484; G06F 21/6218; G06Q 10/101; G06Q 10/103; G06Q 10/06
See application file for complete search history.

(56) References Cited

U.S. PATENT DOCUMENTS

| | | | |
|---|---|---|---|
| 2016/0134667 A1* | 5/2016 | Suresh | H04L 65/403 715/753 |
| 2018/0101524 A1* | 4/2018 | Dunnihoo | G06F 16/438 |
| 2018/0232346 A1* | 8/2018 | Konnola | G06Q 10/101 |
| 2021/0192002 A1* | 6/2021 | Li | G06F 16/904 |
| 2022/0222625 A1* | 7/2022 | Haramati | G06F 3/04847 |
| 2024/0220927 A1* | 7/2024 | Schamp | G06F 9/44521 |

* cited by examiner

*Primary Examiner* — Chris Parry
*Assistant Examiner* — Abderrahmen Chouat
(74) *Attorney, Agent, or Firm* — Alston & Bird LLP

(57) ABSTRACT

Techniques for simultaneously generating adaptive digital content for multiple client computing devices associated with multiple respective user profiles are discussed herein. Embodiments are configured to receive user input data associated with a collaborative document, where the user input data is associated with a user profile stored in a document collaboration platform. Embodiments can generate temporally correlated user input step events based on the user input data, and render, on interactive user interfaces associated with the collaborative document, temporally sequenced digital content generated based on the temporally correlated user input step events. Embodiments can generate suggested adaptive digital content based on model output generated by an adaptive digital content processing model comprised in a document assistance system, where the model output is generated based on the portion of the temporally sequenced digital content, and render, on interactive user interfaces associated with the collaborative document, the suggested adaptive digital content.

20 Claims, 18 Drawing Sheets

```
{
1102    "stepType": "replace",
1104  ┌ "from": 1,
      └ "to": 6,
        "slice": {
            "content": [
              {
1106            "type": "text",
1108            "text": "To be "
              }
            ]
        },
1110    "userId": "User1",
1112    "createdAt": 1662715506600
}
```

Temporally Correlated User
Input Step Event
408

FIG. 11A

```
{
1102    "stepType": "replace",
1104  ┌ "from": 7,
      └ "to": 18,
        "slice": {
            "content": [
              {
1106            "type": "text",
1108            "text": "or not to be"
              }
            ]
        },
1110    "userId": "User2",
1112    "createdAt": 166271564582
}
```

Temporally Correlated User
Input Step Event
408

AUTOMATIC ADAPTIVE DIGITAL CONTENT GENERATION FOR COLLABORATIVE DOCUMENTS USING MACHINE-LEARNING-BASED DIGITAL CONTENT PROCESSING TECHNIQUES

TECHNICAL FIELD

Embodiments of the present disclosure are generally directed to generating digital content for a collaborative document in a document collaboration platform.

BACKGROUND

Various methods, apparatuses, and systems are configured to provide techniques for generating digital content for a collaborative document. Applicant has identified many deficiencies and problems associated with existing methods, apparatuses, and systems for generating adaptive digital content for a collaborative document. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to effectively and efficiently generated adaptive digital content for a collaborative document in a document collaboration server system. For example, certain embodiments of the present invention provide methods, apparatuses, systems, computing devices, and/or the like that are configured to generate adaptive digital content for a collaborative document in a document collaboration server system, by generating temporally sequenced digital content based on input data generated by one or more user computing devices, rendering the temporally sequenced digital content on an interactive user interface associated with the collaborative document, transmitting at least a portion of the sequenced digital content to an adaptive digital content inference server system, generating a suggested adaptive digital content based on model output generated by one or more adaptive digital content processing models comprised in the adaptive digital content inference server system, updating the collaborative document to include the suggested adaptive digital content, and storing the updated collaborative document.

In one aspect, an apparatus for automatically generating adaptive digital content for a collaborative document includes a display, at least one processor, and at least one memory including program code. The at least one memory and the program code are configured to, with the at least one processor, cause the apparatus to receive user input data associated with the collaborative document, where the user input data is generated by a client computing device associated with a user profile identifier, and where the user profile identifier is associated with a user profile stored in a data repository related to a document collaboration platform. The apparatus also includes program code configured to generate, via the document collaboration platform, one or more temporally correlated user input step events based on the user input data. The apparatus also includes program code configured to render, on one or more interactive user interfaces associated with the collaborative document, temporally sequenced digital content generated based on the one or more temporally correlated user input step events, where the temporally sequenced digital content can be associated with the user profile identifier. The apparatus also includes program code configured to generate suggested adaptive digital content based on model output generated by an adaptive digital content processing model comprised in a document assistance system, where the model output is generated based on at least a portion of the temporally sequenced digital content. The apparatus also includes program code configured to render, on the one or more interactive user interfaces associated with the collaborative document, the suggested adaptive digital content.

The apparatus further includes program code configured to receive a confirmation signal associated with the suggested adaptive digital content, where the confirmation signal is generated by the client computing device associated with the user profile identifier, and where the confirmation signal comprises an acceptance of the suggested adaptive digital content or a rejection of the suggested adaptive digital content. The apparatus also includes program code configured to, in response to receiving a confirmation signal comprising the acceptance of the suggested adaptive digital content, update the collaborative document to include the suggested adaptive digital content. The apparatus also includes program code configured to store the updated collaborative document in the data repository.

The apparatus further includes where the one or more temporally correlated user input step events are generated from user input data associated with two or more user profile identifier(s) corresponding to two or more respective client computing devices simultaneously generating digital content for the collaborative document.

The apparatus further includes program code configured to generate suggested adaptive digital content associated with a first user profile identifier based on temporally sequenced digital content generated based on one or more temporally correlated user input step events associated with a second user profile identifier. The apparatus also includes program code configured to render the suggested adaptive digital content via an interactive user interface associated with the first user profile identifier.

The apparatus further includes program code configured to generate first suggested adaptive digital content associated with a first user profile identifier based on temporally sequenced digital content comprised in the collaborative document. The apparatus also includes program code configured to generate second suggested adaptive digital content associated with a second user profile identifier based on the first suggested adaptive digital content associated with the first user profile identifier. The apparatus also includes program code configured to render, simultaneously, the first suggested adaptive digital content via a first interactive user interface associated with the first user profile identifier and the second suggested adaptive digital content via a second interactive user interface associated with the second user profile identifier.

The apparatus further includes program code configured to store, via the document collaboration platform, one or more temporally correlated user input step events associated with a user profile identifier, where the one or more temporally correlated user input step events are generated based on user input data associated with one or more distinct collaborative documents. The apparatus also includes program code configured to generate one or more user passages based on the one or more temporally correlated user input step events. The apparatus also includes program code configured to associate the one or more user passages with a user profile corresponding to the user profile identifier. The apparatus also includes program code configured to generate a user profile content corpus based on the one or more user passages associated with the user profile.

The apparatus further includes program code configured to execute a stylometric transformation on the model output generated by the adaptive digital content processing model based on a stylometric profile associated with one or more user profiles stored in the document collaboration platform, where the stylometric profile reflects an authoring style associated with the one or more user profiles.

The apparatus further includes where the stylometric profile is generated based on a stylometric feature set, where one or more stylometric features comprised in the stylometric feature set are extracted from one or more user passages comprised in one or more user content corpuses associated with one or more respective user profiles.

The apparatus further includes where the adaptive digital content processing model comprised in the document assistance system can be trained based in part on one or more collaborative documents stored by a particular document collaboration platform, where the one or more collaborative documents comprise one or more user passages associated with one or more respective user profiles, where the one or more respective user profiles are associated with the particular document collaboration platform, and where model output generated by the adaptive digital content processing model trained based in part on the one or more collaborative documents reflects an enterprise authoring style related to the particular document collaboration platform.

The apparatus further includes where the temporally sequenced digital content can be associated with one or more input languages, where the suggested adaptive digital content is generated based on model output generated by an adaptive digital content processing model trained on a respective language of the one or more input languages.

In one aspect, a computer-implemented method for automatically generating adaptive digital content for a collaborative document includes receiving user input data associated with the collaborative document, where the user input data is generated by a client computing device associated with a user profile identifier, and where the user profile identifier is associated with a user profile stored in a data repository related to a document collaboration platform. The computer-implemented method also includes generating, via the document collaboration platform, one or more temporally correlated user input step events based on the user input data. The computer-implemented method also includes rendering, on one or more interactive user interfaces associated with the collaborative document, temporally sequenced digital content generated based on the one or more temporally correlated user input step events, where the temporally sequenced digital content can be associated with the user profile identifier. The computer-implemented method also includes generating suggested adaptive digital content based on model output generated by an adaptive digital content processing model comprised in a document assistance system, where the model output is generated based on at least a portion of the temporally sequenced digital content. The computer-implemented method also includes rendering, on the one or more interactive user interfaces associated with the collaborative document, the suggested adaptive digital content.

The computer-implemented method further includes receiving a confirmation signal associated with the suggested adaptive digital content, where the confirmation signal is generated by the client computing device associated with the user profile identifier, and where the confirmation signal comprises an acceptance of the suggested adaptive digital content or a rejection of the suggested adaptive digital content. The computer-implemented method also includes, in response to receiving a confirmation signal comprising the acceptance of the suggested adaptive digital content, updating the collaborative document to include the suggested adaptive digital content. The computer-implemented method also includes storing the updated collaborative document in the data repository.

The computer-implemented method further includes where the one or more temporally correlated user input step events are generated from user input data associated with two or more user profile identifier(s) corresponding to two or more respective client computing devices simultaneously generating digital content for the collaborative document.

The computer-implemented method further includes generating suggested adaptive digital content associated with a first user profile identifier based on temporally sequenced digital content generated based on one or more temporally correlated user input step events associated with a second user profile identifier. The computer-implemented method also includes rendering the suggested adaptive digital content via an interactive user interface associated with the first user profile identifier.

The computer-implemented method further includes generating first suggested adaptive digital content associated with a first user profile identifier based on temporally sequenced digital content comprised in the collaborative document. The computer-implemented method also includes generating second suggested adaptive digital content associated with a second user profile identifier based on the first suggested adaptive digital content associated with the first user profile identifier. The computer-implemented method also includes rendering, simultaneously, the first suggested adaptive digital content via a first interactive user interface associated with the first user profile identifier and the second suggested adaptive digital content via a second interactive user interface associated with the second user profile identifier.

The computer-implemented method further includes storing, via the document collaboration platform, one or more temporally correlated user input step events associated with a user profile identifier, where the one or more temporally correlated user input step events are generated based on user input data associated with one or more distinct collaborative documents. The computer-implemented method also includes generating one or more user passages based on the one or more temporally correlated user input step events. The computer-implemented method also includes associating the one or more user passages with a user profile corresponding to the user profile identifier. The computer-implemented method also includes generating a user profile content corpus based on the one or more user passages associated with the user profile.

The computer-implemented method further includes executing a stylometric transformation on the model output generated by the adaptive digital content processing model based on a stylometric profile associated with one or more user profiles stored in the document collaboration platform, where the stylometric profile reflects an authoring style associated with the one or more user profiles.

The computer-implemented method further includes where the stylometric profile is generated based on a stylometric feature set, where one or more stylometric features comprised in the stylometric feature set are extracted from one or more user passages comprised in one or more user content corpuses associated with one or more respective user profiles.

The computer-implemented method further includes where the adaptive digital content processing model comprised in the document assistance system can be trained based in part on one or more collaborative documents stored by a particular document collaboration platform, where the one or more collaborative documents comprise one or more user passages associated with one or more respective user profiles, where the one or more respective user profiles are associated with the particular document collaboration platform, and where model output generated by the adaptive digital content processing model trained based in part on the one or more collaborative documents reflects an enterprise authoring style related to the particular document collaboration platform.

The computer-implemented method further includes where the temporally sequenced digital content can be associated with one or more input languages, where the suggested adaptive digital content is generated based on model output generated by an adaptive digital content processing model trained on a respective language of the one or more input languages.

In one aspect, a non-transitory computer-readable storage medium for automatically generating adaptive digital content for a collaborative document includes instructions that when executed by at least one processor, cause the at least one processor to receive user input data associated with the collaborative document, where the user input data is generated by a client computing device associated with a user profile identifier, and where the user profile identifier is associated with a user profile stored in a data repository related to a document collaboration platform. The non-transitory computer-readable storage medium also includes instructions configured to generate, via the document collaboration platform, one or more temporally correlated user input step events based on the user input data. The non-transitory computer-readable storage medium also includes instructions configured to render, on one or more interactive user interfaces associated with the collaborative document, temporally sequenced digital content generated based on the one or more temporally correlated user input step events, where the temporally sequenced digital content can be associated with the user profile identifier. The non-transitory computer-readable storage medium also includes instructions configured to generate suggested adaptive digital content based on model output generated by an adaptive digital content processing model comprised in a document assistance system, where the model output is generated based on at least a portion of the temporally sequenced digital content. The non-transitory computer-readable storage medium also includes instructions configured to render, on the one or more interactive user interfaces associated with the collaborative document, the suggested adaptive digital content.

The non-transitory computer-readable storage medium further includes instructions configured to receive a confirmation signal associated with the suggested adaptive digital content, where the confirmation signal is generated by the client computing device associated with the user profile identifier, and where the confirmation signal comprises an acceptance of the suggested adaptive digital content or a rejection of the suggested adaptive digital content. The non-transitory computer-readable storage medium also includes instructions configured to, in response to receiving a confirmation signal comprising the acceptance of the suggested adaptive digital content, update the collaborative document to include the suggested adaptive digital content. The non-transitory computer-readable storage medium also includes instructions configured to store the updated collaborative document in the data repository.

The non-transitory computer-readable storage medium further includes where the one or more temporally correlated user input step events are generated from user input data associated with two or more user profile identifier(s) corresponding to two or more respective client computing devices simultaneously generating digital content for the collaborative document.

The non-transitory computer-readable storage medium further includes instructions configured to generate suggested adaptive digital content associated with a first user profile identifier based on temporally sequenced digital content generated based on one or more temporally correlated user input step events associated with a second user profile identifier. The non-transitory computer-readable storage medium also includes instructions configured to render the suggested adaptive digital content via an interactive user interface associated with the first user profile identifier.

The non-transitory computer-readable storage medium further includes instructions configured to generate first suggested adaptive digital content associated with a first user profile identifier based on temporally sequenced digital content comprised in the collaborative document. The non-transitory computer-readable storage medium also includes instructions configured to generate second suggested adaptive digital content associated with a second user profile identifier based on the first suggested adaptive digital content associated with the first user profile identifier. The non-transitory computer-readable storage medium also includes instructions configured to render, simultaneously, the first suggested adaptive digital content via a first interactive user interface associated with the first user profile identifier and the second suggested adaptive digital content via a second interactive user interface associated with the second user profile identifier.

The non-transitory computer-readable storage medium further includes instructions configured to store, via the document collaboration platform, one or more temporally correlated user input step events associated with a user profile identifier, where the one or more temporally correlated user input step events are generated based on user input data associated with one or more distinct collaborative documents. The non-transitory computer-readable storage medium also includes instructions configured to generate one or more user passages based on the one or more temporally correlated user input step events. The non-transitory computer-readable storage medium also includes instructions configured to associate the one or more user passages with a user profile corresponding to the user profile identifier. The non-transitory computer-readable storage medium also includes instructions configured to generate a user profile content corpus based on the one or more user passages associated with the user profile.

The non-transitory computer-readable storage medium further includes where the instructions configured to generate the suggested adaptive digital content further cause the at least one processor to execute a stylometric transformation on the model output generated by the adaptive digital content processing model based on a stylometric profile associated with one or more user profiles stored in the document collaboration platform, where the stylometric profile reflects an authoring style associated with the one or more user profiles.

The non-transitory computer-readable storage medium further includes where the stylometric profile is generated based on a stylometric feature set, where one or more stylometric features comprised in the stylometric feature set are extracted from one or more user passages comprised in one or more user content corpuses associated with one or more respective user profiles.

The non-transitory computer-readable storage medium further includes instructions configured to where the adaptive digital content processing model comprised in the document assistance system can be trained based in part on one or more collaborative documents stored by a particular document collaboration platform, where the one or more collaborative documents comprise one or more user passages associated with one or more respective user profiles, where the one or more respective user profiles are associated with the particular document collaboration platform, and where model output generated by the adaptive digital content processing model trained based in part on the one or more collaborative documents reflects an enterprise authoring style related to the particular document collaboration platform.

The non-transitory computer-readable storage medium further includes instructions configured to where the temporally sequenced digital content can be associated with one or more input languages, where the suggested adaptive digital content is generated based on model output generated by an adaptive digital content processing model trained on a respective language of the one or more input languages.

BRIEF DESCRIPTION OF THE SEVERAL VIEWS OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein. To easily identify the discussion of any particular element or act, the most significant digit or digits in a reference number refer to the figure number in which that element is first introduced.

FIGS. 11A-B provide operational examples of temporally correlated user input step events associated with a collaborative document in accordance with one or more embodiments of the present disclosure.

FIG. 14 provides an operational example of automatic adaptive digital content generation related to a specific input language for a collaborative document in accordance with one or more embodiments of the present disclosure.

DETAILED DESCRIPTION

Figure 1:
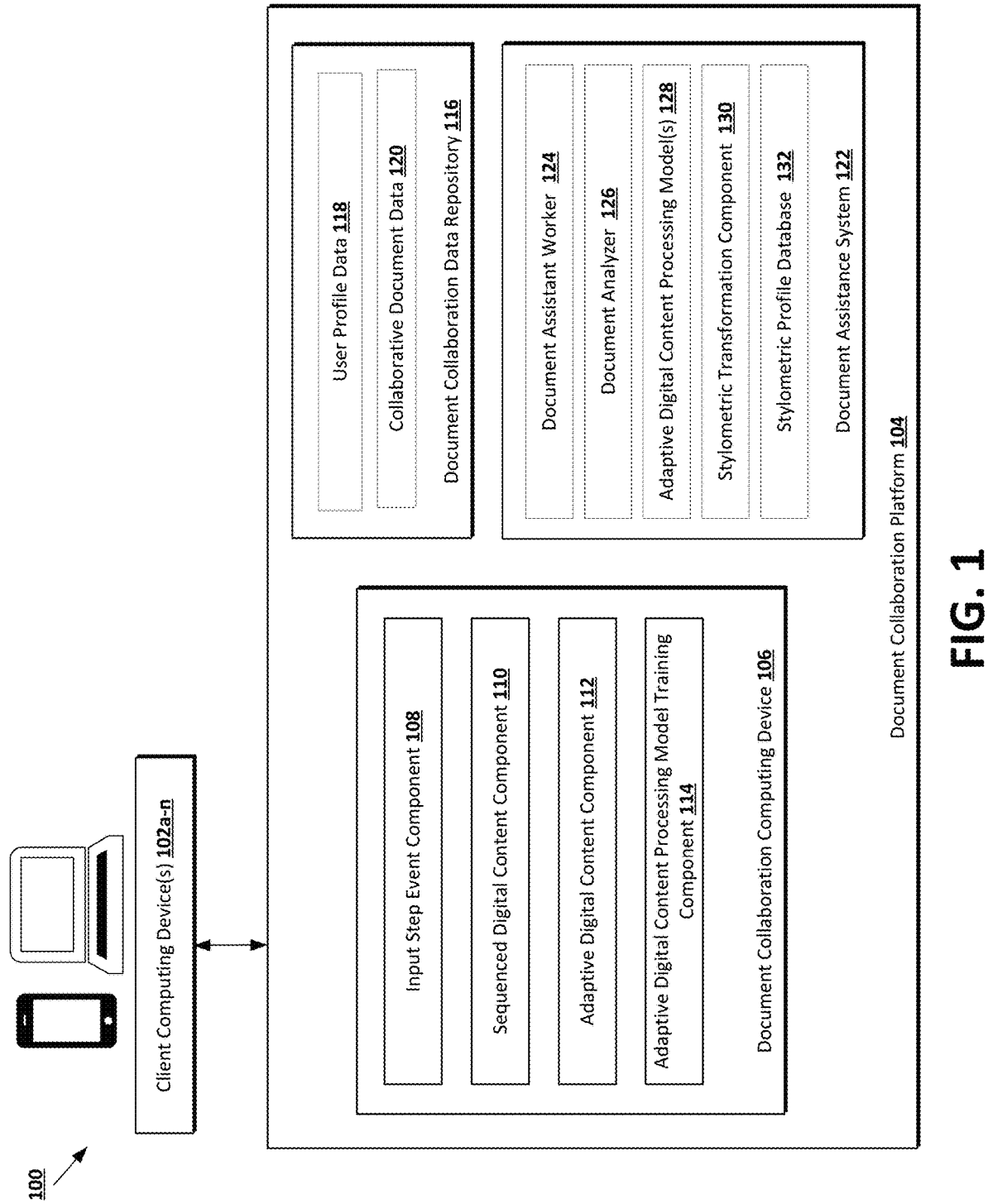
FIG. 1 is a block diagram of an exemplary document collaboration platform architecture configured for automatic adaptive digital content generation for a collaborative document in accordance with one or more embodiments of the present disclosure.

Various embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. The terms "illustrative," "example," and "exemplary" are used to be examples with no indication of quality level. Like numbers refer to like elements throughout.

Overview

Various embodiments of the present invention address technical problems associated with generating adaptive digital content for collaborative documents. The disclosed techniques can be utilized by a document collaboration platform to automatically generate adaptive digital content for a collaborative document being accessed by one or more client computing devices associated with one or more respective user profiles stored associated with the document collaboration platform. Various embodiments are configured to automatically generate adaptive digital content in a respective authoring style associated with data extracted from the one or more respective user profiles based on temporally sequenced digital content generated for the collaborative document. An example of a document collaboration platform that may use the automatic adaptive digital content generation techniques disclosed herein is the Confluence® collaborative document management platform that is offered by Atlassian PTY LTD.

Automatically generating adaptive digital content in an authoring style related to a particular user profile in the context of multi-user collaboration (i.e., while a client computing device associated with a first user profile is simultaneously collaborating with one or more other client computing devices associated with one or more other respective user profiles) presents a difficult challenge. Traditionally, digital content generation models (e.g., natural language processing models) are trained only on a global corpus of documents, and therefore produce generic model output. Such digital content generation models also fail to consider situations in which multiple client computing devices associated with multiple user profiles associated with unique respective authoring styles collaboratively generating digital content simultaneously in the same collaborative document.

Various embodiments of the present invention are configured to automatically generate adaptive digital content for one or more client computing devices collaboratively accessing a collaborative document that represents a group-level authoring intent while also considering the individual authoring styles associated with the one or more user profiles associated with the one or more respective client computing devices. Automatic adaptive digital content generation techniques, such as the ones disclosed herein, can overcome the challenge of automatically generating digital content for a collaborative document associated with multiple user profiles associated with multiple respective client computing devices. Automatically, efficiently, and simultaneously generating adaptive digital content for multiple client computing devices in a collaborative document reduces the computational load associated with the respective document collaboration platform and said client computing devices. Additionally, the techniques described herein reduce the time, human resources, and mental load on one or more end users associated with one or more respective client computing devices that are simultaneously generating digital content for the collaborative document.

Embodiments of the present disclosure are directed to a document collaboration platform configured to automatically generate suggested adaptive digital content for one or more user profiles associated with a particular collaborative document. The suggested adaptive digital content generated for the one or more user profiles reflects an authoring style associated with the one or more respective user profiles. Additionally, the document collaboration platform can simultaneously generate adaptive digital content for multiple user profiles associated with a collaborative document such that a group authoring intent and/or style is represented in the suggested adaptive digital content.

In an example embodiment, two end users, for example, Alice and Bob of ACME Inc., can be associated with two respective user profiles related to a document collaboration platform (e.g., Confluence®). Alice and Bob's user profiles can include or be correlated to collaborative platform usage data that reflects distinct authoring styles and backgrounds of expertise associated with Alice and Bob, respectively. For instance, Alice could be a lead graphic designer whose user profile includes a role identifier, and usage data that reflects her expertise in graphic design. Bob could be a lead software engineer at whose user profile includes a role identifier, and usage data that reflects his expertise in software engineering. Alice and Bob's user profiles are also correlated to other usage data or working graphs that can be used as a training set or corpus to identify authoring styles as will be discussed in greater detail below.

Both Alice and Bob may want to access and collaborate on a project plan document (e.g., a collaborative document) managed by the document collaboration platform (e.g., Confluence®). As Alice and Bob begin generating text in the project plan document (e.g., generating digital content), the document collaboration platform can automatically generate suggested adaptive digital content based on the respective user profiles (and/or any associated usage data) associated with Alice and Bob. In some embodiments, the suggested adaptive digital content generated by the document collaboration platform can be one or more passages of text generated in response to the text Alice and Bob have already generated in the collaborative document, where the suggested adaptive digital content is configured to represent the respective authoring styles associated with the respective user profiles associated with Alice and Bob.

In scenarios in which Alice may be accessing and generating digital content (e.g., generating text) for the project plan by herself, the document collaboration platform can generate suggested adaptive content that solely represents Alice's authoring style. For example, for a given sentence stem (e.g., a given portion of a sentence generated in the collaborative document), the document collaboration platform can generate suggested adaptive digital content related (where appropriate) to graphic design, user experiences, and/or design principles related to Alice's expertise and background. In contrast, if Bob were accessing and generating digital content for the project plan by himself, the document collaboration platform can generate suggested adaptive digital content in response to the same sentence stem, however the suggested digital content could be related to software engineering, programming practices, and/or software requirements related to the project. In both scenarios, the document collaboration platform can generate suggested adaptive digital content representative of an authoring style associated with a respective user profile.

An authoring style associated with a particular user profile can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences) an input language (e.g., Spanish, Italian, or Hindi), a subject matter (e.g., economics, design, engineering, etc.) a subject matter (e.g., economics, design, engineering, etc.) and/or any combination thereof.

In another example embodiment, Alice and Bob can simultaneously generate digital content for the same project plan (e.g., the same collaborative document) via the document collaboration platform (e.g., Confluence®). In such a scenario, the document collaboration platform can still generate suggested adaptive digital content based on each of Alice and Bob's respective user profiles, however the document collaboration platform can also determine a group authoring intent. The group authoring intent can be determined based on the digital contents of the collaborative document generated by Alice and Bob, as well as the suggested adaptive digital content generated for Alice and Bob by the document collaboration platform.

The document collaboration platform embodies and/or integrates with various computing devices, systems, non-transitory data repositories, machine learning models, and/or communication networks for executing the automatic adaptive digital content generation techniques described herein. For example, the document collaboration platform comprises and/or integrates with one or more client computing devices, one or more document collaboration computing devices, a document collaboration data repository, and a document assistance system.

The document collaboration computing device is configured to receive and analyze user input data generated by one or more client computing devices associated with one or more respective user profiles (e.g., the user profiles associated with Alice and Bob respectively). For example, Alice can generate user input data by interacting with a client computing device accessing a collaborative document from the collaborative document platform. The user input data can comprise data associated with one or more input commands generated by one or more peripheral input devices capable of manipulating a client computing device. The document collaboration computing device is configured to generate, based on the user input data, one or more temporally correlated user input step events. The one or more temporally correlated user input step events are electronically managed data objects comprising one or more portions of metadata related to the user input data and/or the collaborative document.

The document collaboration computing device can determine, based on metadata related to one or more respective user profile identifiers associated with the one or more temporally correlated user input step events, a corresponding user profile (e.g., a user profile corresponding to Alice) with which to associate the one or more temporally correlated user input step events. For example, the document collaboration computing device can update the respective user profiles associated with Alice and/or Bob comprised in a data store associated with the document collaboration platform (e.g., the document collaboration data repository) such that the respective user profiles associated with Alice and/or Bob become associated with the respective temporally correlated user input step events. The document collaboration computing device is also configured to transmit the one or more temporally correlated user input step events to the document assistance system for processing and generating adaptive digital content for Alice and Bob as they collaborate on a particular collaborative document.

The document collaboration computing device is also configured to generate temporally sequenced digital content based on one or more temporally correlated user input step events and render the temporally sequenced digital content on one or more interactive user interfaces associated with a collaborative document. For instance, the document collaboration computing device can parse, organize, structure, and/or prioritize the one or more temporally correlated user input step events to generate the temporally sequenced digital content. As a non-limiting example, the temporally sequenced digital content can be one or more words, one or more sentences, and/or one or more passages written by Alice and/or Bob via one or more respective interactive user interfaces associated with the collaborative document. The document collaboration computing device is also configured to associate the one or more portions of temporally sequenced digital content with the respective user profiles associated with Alice and/or Bob based on the metadata related to one or more user profile identifiers associated with the temporally sequenced digital content.

Furthermore, the document collaboration computing device is configured to generate one or more user passages for a user profile based on one or more portions of temporally sequenced digital content. User profiles (e.g., the user profiles associated with Alice and Bob) stored in a data store associated with the document collaboration platform (e.g., the document collaboration data repository) can be associated with a respective user profile content corpus comprising various portions of data related to, but not limited by, one or more temporally correlated user input step events, one or more portions of temporally sequenced digital content, and/or one or more user passages associated with a particular user profile that have been collected by the document collaboration computing device from one or more collaborative documents stored in the data store associated with the document collaboration platform (e.g., the document collaboration data repository).

In various embodiments, the document collaboration computing device is also configured to transmit one or more portions of temporally sequenced digital content to the document assistance system for processing and generating adaptive digital content for one or more user profiles collaborating on a particular collaborative document. For example, as Alice and/or Bob generate temporally sequenced digital content (e.g., digital text) in the collaborative document, the document collaboration computing device can transmit one or more portions of the temporally sequenced digital content to the document assistance system. In response to receiving the temporally sequenced digital content, the document assistance system can generate adaptive digital content (e.g., suggested text) for Alice and/or Bob's respective user profiles.

The document collaboration computing device is also configured to receive, from the document assistance system, one or more portions of adaptive digital content for one or more respective user profiles (e.g., user profiles associated with Alice and Bob) associated with one or more respective client computing devices generating digital content for a collaborative document. Based on the received adaptive digital content, the document collaboration computing device is configured to generate suggested adaptive digital content for one or more user profiles. For example, based on the one or more portions of adaptive digital content generated in response to the temporally sequenced digital content generated by Alice and/or Bob, the document collaboration computing device is configured to generate suggested adaptive digital content reflecting the authoring style related to the respective user profiles associated with Alice and/or Bob. The document collaboration computing device can render the suggested adaptive digital content on one or more client computing devices associated with Alice and/or Bob via one or more respective interactive user interfaces associated with the collaborative document.

The document collaboration computing device is also configured to generate, train, and/or retrain one or more machine learning models (e.g., adaptive digital content processing models) for the document assistance system. One or more adaptive digital content processing models can be trained based on one or more portions of data comprised in a document collaboration data repository associated with a particular document collaboration platform. For example, an adaptive digital content processing model can be trained based in part on one or more collaborative documents stored by a document collaboration platform associated with ACME Inc., where the one or more collaborative documents comprise one or more user passages associated with one or more respective user profiles associated with Alice and/or Bob. The default model output generated by an adaptive digital content processing model trained based in part on the one or more collaborative documents can reflect an enterprise authoring style reflecting a defined authoring style associated with a particular company, enterprise, and/or other organizational structure (e.g., Alice and Bob's company, ACME Inc.). In this regard, adaptive digital content can be generated to reflect the lexicon, preferred writing style, history, values, mission, objectives, goals, and/or public-facing persona associated with the particular company, enterprise, and/or other organizational structure.

The document assistance system is configured to receive one or more portions of data from the document collaboration computing device including, but not limited to, one or more temporally correlated user input step events, one or more portions of temporally sequenced digital content, one or more portions of user profile data, and/or one or more portions of collaborative document data. The document assistance system is also configured to receive one or more portions of metadata associated with a particular collaborative document such as metadata associated with a relative position of a text cursor (e.g., a dynamic text insertion cursor) associated with a particular user profile within the collaborative document.

The document assistance system is configured to ingest one or more temporally correlated user input step events that have been enqueued into in an event processing queue and/or one or more portions of metadata (e.g., one or more user profile identifiers associated with Alice and/or Bob) related to a particular collaborative document. For example, as Alice and/or Bob simultaneously generate digital content for a particular collaborative document via one or more respective client computing devices, one or more temporally correlated user input step events associated with the respective user profiles related to Alice and/or Bob are enqueued into in an event processing queue associated with the document assistance system. The document assistance system is also configured to generate collaborator metadata from the one or more temporally correlated user input step events and/or the collaborative document. In various embodiments, the collaborator metadata can comprise metadata including, but not limited to, one or more user profiles (e.g., the user profiles related to Alice and Bob), a document position associated with one or more dynamic text insertion cursors associated with a respective user profile, and/or other metadata associated with the one or more user profiles.

The document assistance system is also configured to generate a data object (e.g., a document object) representative of the particular collaborative document based on the contents of the event processing queue and the metadata associated with the particular collaborative document. For example, the document assistance system can incrementally build the document object as more temporally correlated user input step events associated with Alice and/or Bob are added to the event processing queue. In this way, the document assistance system has a real-time state of the particular collaborative document and the current positions of the one or more dynamic text insertion cursors related to a relative typing position associated with the respective client computing devices associated with Alice and/or Bob as the respective client computing devices generate digital content for the particular collaborative document.

The document assistance system is configured to determine whether the entire document object should be used to generate adaptive digital content for a particular collaborative document or whether one or more portions of the document object (e.g., one or more portions of temporally sequenced digital content comprised in the collaborative document) should be used to generate the adaptive digital content. For example, if the size of the document object surpasses a predefined document size threshold, the document assistance system can determine to parse a predefined portion of temporally sequenced digital content relative to the position of a dynamic text insertion cursor on an interactive user interface associated with the collaborative document. The dynamic text insertion cursor indicates a relative typing position associated with a respective client computing device associated with a respective user profile associated with Alice and/or Bob.

The document assistance system, by way of the one or more adaptive digital content processing models comprised therein, can generate default model output based in part on one or more collaborative documents associated with the document collaboration platform. The default model output can reflect an enterprise authoring style reflecting a defined authoring style associated with a particular company, enterprise, and/or other organizational structure. For example, the default model output can reflect an authoring style curated by Alice and Bob's company, ACME Inc. In this regard, adaptive digital content can be generated to reflect the lexicon, preferred writing style, history, values, mission, objectives, goals, and/or public-facing persona associated with a particular company, enterprise, and/or other organizational structure.

The document assistance system is also configured to execute one or more stylometric transformation algorithms by one or more machine-learning-based neural language models, where the stylometric transformation algorithms are directed towards converting the default model output of an adaptive digital content processing model into adaptive digital content that is representative of an authoring style associated with one or more user profiles. For example, a stylometric transformation component can receive the default model output from the adaptive digital content processing models reflecting a default, enterprise authoring style associated with ACME Inc. and determine a relevant stylometric profile from a plurality of stylometric profiles comprised in a stylometric profile database based on one or more pieces of metadata associated with the document object (e.g., metadata related to the user profile identifiers associated with Alice and/or Bob).

Based on a stylometric feature vector associated with the determined stylometric profile, the stylometric transformation component can employ the one or more machine-learning-based neural language models to transform the default model output such that the stylometric model output is representative of an authoring style related to the one or more user profiles associated with the one or more respective client computing devices simultaneously generating digital content for the corresponding collaborative document. For example, if the document assistance system determines that Alice and/or Bob are generating digital content for a collaborative document, the document assistance system can use a stylometric profile associated with respective user profiles associated with Alice and/or Bob to transform the default model output associated with ACME Inc. In this way, the document assistance system can generate adaptive digital content that coheres to the enterprise authoring style of ACME Inc. as well as an authoring style related to the respective user profiles associated with Alice and/or Bob.

Definitions

The term "collaborative document" refers to a data construct that describes digital content of a digital file that can be generated based on various types of file formats, where the digital content of the file is configured to be editable/accessible by one or more client computing devices associated with one or more respective user profiles. For example, the digital content can include, but is not limited to, text, lists, tables, spreadsheets, graphs, flowcharts, drawings, images and/or the like. A document collaboration computing device associated with a document collaboration platform can generate one or more interactive user interfaces associated with a particular collaborative document such that one or more client computing devices associated with one or more respective user profiles can simultaneously generate, update, and/or remove temporally sequenced digital content associated with the collaborative document. One or more collaborative documents can be stored in a document collaboration data repository of a document collaboration platform that comprises the document collaboration computing device. For example, the document collaboration platform may enable a first user profile to share a collaborative document with one or more other user profiles, where each of the one or more user profiles may be given defined read/write access privileges to the collaborative document. An example of a collaborative document is a Confluence® page.

The term "document collaboration platform" refers to a collaborative work platform directed towards enabling one or more client computing devices associated with one or more respective user profiles associated with a company, enterprise, and/or other organizational structure to work simultaneously on documents, projects, and/or other various types of deliverables. A document collaboration computing device associated with a document collaboration platform can generate one or more interactive user interfaces associated with a particular collaborative document such that one or more client computing devices associated with one or more respective user profiles can simultaneously generate, update, and/or remove temporally sequenced digital content associated with the collaborative document. As such, the same representation of temporally sequenced digital content associated with a particular collaborative document is rendered on one or more respective interactive user interfaces associated with the one or more client computing devices, and any generation, update, and/or removal of the temporally sequenced digital content is rendered in near real time on the one or more respective interactive user interfaces.

A document collaboration platform can store a large number of collaborative documents that may be accessible/editable by one or more user profiles. Each collaborative document may at each time be accessed by a group of user profiles that is larger than the group of user profiles that created the documents, and different portions of collaborative documents may be created by different user profiles. Moreover, various collaborative documents created by different groups of user profiles may contain links/references to each other and may enable user profiles to transition from one collaborative document to another collaborative document by selecting the noted links/references. An example of a document collaboration platform that may use the adaptive digital content generation techniques disclosed herein is the Confluence® collaborative document management platform that is owned by Atlassian PTY LTD.

The term "user input data" refers to data associated with one or more input commands generated by one or more peripheral input devices capable of manipulating a client computing device. For example, the one or more input commands can be commands issued by a computer mouse, computer keyboard, electronic touchpad, interactive touch display, electronic stylus, and/or the like. The one or more input commands can be directed towards configuring one or more portions of temporally sequenced digital content rendered via an interactive user interface associated with a collaborative document. The user input data can be associated with a user profile identifier corresponding to a user profile stored in a document collaboration data repository associated with the document collaboration platform.

The term "temporally correlated user input step event" refers to a structured, electronically managed data object generated via a document collaboration computing device based on one or more portions of user input data. A temporally correlated user input step event can contain various portions of metadata related to, but not limited by, an input step event type, an input step event sequence range, a digital content type identifier, one or more portions of digital content data, a user profile identifier, and/or timestamp data associated with the temporally correlated user input step event. The metadata comprised in one or more temporally correlated user input step events can be used by the document collaboration computing device to generate one or more portions of temporally sequenced digital content for rendering on one or more interactive user interfaces associated with a particular collaborative document.

The term "temporally sequenced digital content" refers to organized digital content that can be rendered on one or more interactive user interfaces associated with a particular collaborative document. The temporally sequenced digital content is generated by a document collaboration computing device based on the data comprised in one or more temporally correlated user input step events associated with a particular collaborative document. For instance, the document collaboration computing device can parse, structure, and/or organize the metadata related to the one or more temporally correlated user input step events associated with one or more user profiles that are simultaneously generating digital content (e.g., text, lists, tables, spreadsheets, graphs, flowcharts, drawings, images and/or the like) for a collaborative document such that the simultaneously generated digital content is correctly organized and rendered as temporally sequenced digital content on one or more respective interactive user interfaces associated with the collaborative document.

In an embodiment, a document collaboration computing device associated with a document collaboration platform can generate one or more interactive user interfaces associated with a particular collaborative document such that one or more client computing devices associated with one or more respective user profiles can simultaneously generate, update, and/or remove the temporally sequenced digital content associated with a particular collaborative document. As such, the same representation of the temporally sequenced digital content associated with the particular collaborative document is rendered on the one or more respective interactive user interfaces associated with the one or more client computing devices, and any generation, update, and/or removal of the temporally sequenced digital content is rendered in near real time on the one or more respective interactive user interfaces.

The term "document assistance system" refers to a system associated with a document collaboration platform configured to generate one or more portions of adaptive digital content for a collaborative document. The document assistance system is configured to receive one or more temporally correlated user input step events associated with a particular collaborative document from the document collaboration computing device. The document assistance system enqueues the one or more temporally correlated user input step events into an event processing queue in order to maintain the sequence of the one or more temporally correlated user input step events and employs a document assistant worker to generate a document object representative of the collaborative document based on the contents of the event processing queue and other metadata collected from the collaborative document. A document analyzer of the document assistance system is employed to determine whether the entire document object should be used to generate adaptive digital content or whether one or more portions of the document object (e.g., one or more portions of temporally sequenced digital content comprised in the collaborative document) should be used to generate the adaptive digital content.

The document assistance system is also configured to locate, fetch, employ, update, store, and/or remove adaptive digital content processing models associated with the document collaboration platform. In some embodiments, an adaptive digital content processing model can be neural language model trained based in part on one or more collaborative documents stored by a particular document collaboration platform, where the one or more collaborative documents comprise one or more user passages associated with one or more respective user profiles associated with the particular document collaboration platform. The default model output generated by an adaptive digital content processing model trained based in part on the one or more collaborative documents can reflect an enterprise authoring style reflecting a default authoring style associated with a particular company, enterprise, and/or other organizational structure. In this regard, adaptive digital content can be generated to reflect the lexicon, preferred writing style, history, values, mission, objectives, goals, and/or public-facing persona associated with the particular company, enterprise, and/or other organizational structure.

The document assistance system is also configured to generate, locate, fetch, employ, update, store, and/or remove stylometric profiles associated with one or more user profiles stored in the collaboration document data repository. The document assistance system is employed by a document collaboration computing device to determine a relevant stylometric profile with which to generate suggested adaptive digital content for a collaborative document. The document assistance system can determine a relevant stylometric profile based on one or more parameters defined by the document collaboration computing device. For example, in some embodiments, the document assistance system can determine a relevant stylometric profile based on one or more user profiles associated with the data comprised within the document object corresponding to the collaborative document that was generated by the document assistant worker.

In other embodiments, the document assistance system can determine a relevant stylometric profile based on portions of temporally sequenced digital content rendered on one or more interactive user interfaces associated with the collaborative document. The document assistance system can, by way of a stylometric transformation component, execute one or more stylometric transformations on the default model output generated by the adaptive digital content processing model based on a relevant stylometric profile selected by the document assistance system. In various embodiments, executable program code associated with the one or more stylometric transformations can be executed by the document assistance system to generate suggested adaptive digital content. In various other embodiments, the executable program code associated with the one or more stylometric transformations can be executed by the document collaboration computing device.

Based on the results of the one or more stylometric transformations, the document collaboration computing device can generate one or more portions of suggested adaptive digital content representative of an authoring style associated with the one or more user profiles associated with the stylometric profile and render the suggested adaptive digital content on the one or more interactive user interfaces associated with the collaborative document. An authoring style can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences), an input language (e.g., Spanish, Italian, or Hindi), a subject matter (e.g., economics, design, engineering, etc.) and/or any combination thereof.

The term "adaptive digital content processing model" refers to a machine-learning-based model employed to automatically generate one or more portions of adaptive digital content as model output in response to receiving one or more portions of a document object generated by a document assistant worker associated with a document assistance system. In various embodiments, an adaptive digital content processing model can be a machine learning model configured based on an artificial neural network (ANN), a recurrent neural network (RNN), a convolutional neural network (CNN), a natural language processing (NLP) model, and/or any other relevant machine learning model configured to employ artificial intelligence and/or machine reasoning to generate model output based on model input provided by a document collaboration computing device. One or more adaptive digital content processing models can be trained based on one or more portions of data comprised in a document collaboration data repository associated with a particular document collaboration platform. For example, an adaptive digital content processing model can be trained based in part on one or more collaborative documents stored by a particular document collaboration platform, where the one or more collaborative documents comprise one or more user passages associated with one or more respective user profiles associated with the particular document collaboration platform.

The default model output generated by an adaptive digital content processing model trained based in part on the one or more collaborative documents can reflect an enterprise authoring style reflecting a defined authoring style associated with a particular company, enterprise, and/or other organizational structure. In this regard, adaptive digital content can be generated to reflect the lexicon, preferred writing style, history, values, mission, objectives, goals, and/or public-facing persona associated with the particular company, enterprise, and/or other organizational structure. Additionally and/or alternatively, an adaptive digital content processing model can be a neural language model trained based in part on a global corpus of documents scraped from the Internet and can generate default model output based on the contents of the global corpus of documents in response to receiving model input associated with the collaborative document from the document collaboration computing device.

The term "stylometric profile" refers to an electronically managed data object comprising one or more portions of metadata representative of an authoring style associated with one or more user profiles stored in a document collaboration data repository of a document collaboration platform. A document builder associated with a document assistance system can extract collaborative documents and user passages from one or more user content corpuses associated with one or more respective user profiles stored in a document collaboration data repository. The document builder is configured to compile and structure the extracted collaborative documents and user passages and transmit them to an author attribution component. The author attribution component classifies the collaborative documents and user passages according to the respective user profiles to which the collaborative documents and user passages are associated. In some scenarios, only one user profile will be attributed to a particular collaborative document and/or passage, while in other scenarios, multiple user profiles will be attributed to a particular collaborative document and/or passage that the multiple user profiles contributed to. In this way, stylometric profiles can be generated for individual user profiles as well as combinations of two or more user profiles associated with a document collaboration platform.

A stylometric feature extraction component can apply various stylometric feature extraction algorithms and/or machine learning models on the classified documents and user passages in order to generate a set of stylometric features associated with an authoring style related to the one or more user profiles. For example, the stylometric feature extraction component can determine various stylometric features related to, but limited by, a readability index, sentence averaging counts (e.g., average words, characters, punctuation marks, emoticons, and/or the like), a grammatical profile (e.g., parts of speech, adjectives per sentence, and/or the like), and/or a language variance profile (e.g., function words used, business words used, academic terms used, and/or the like). Based in part on the extracted set of stylometric features, the stylometric feature extraction component can generate a stylometric profile associated with the one or more user profiles associated with the documents and user passages classified by the author attribution component. The stylometric feature set associated with a particular user profile can be used in part by a stylometric transformation component to transform default model output generated by the adaptive digital content processing model into stylometric model output that is representative of the authoring style associated with the particular user profile.

The term "stylometric transformation" refers to an execution of one or more algorithms by one or more machine-learning-based neural language models comprised in a stylometric transformation component, where the algorithms are directed towards transforming the default model output of an adaptive digital content processing model into adaptive digital content that is representative of an authoring style associated with one or more user profiles.

For instance, a document collaboration computing device can transmit a portion of temporally sequenced digital content from a collaborative document to a document assistance system which can in turn employ an adaptive digital content processing model to generate default model output based on the temporally sequenced digital content. The stylometric transformation component can receive the default model output from the adaptive digital content processing model and determine a relevant stylometric profile from a plurality of stylometric profiles comprised in a stylometric profile database based on one or more pieces of metadata associated with one or more user profiles. Based on the determined stylometric profile, the stylometric transformation component can employ the one or more machine-learning-based neural language models to transform the default model output into stylometric model output such that the stylometric model output is representative of an authoring style associated with the one or more user profiles. The document collaboration computing device can generate suggested adaptive digital content based on the stylometric model output and render the suggested adaptive digital content on one or more interactive user interfaces associated with the collaborative document.

The term "suggested adaptive digital content" refers to adaptive digital content rendered by a document collaboration computing device on one or more interactive user interfaces associated with a particular collaborative document. The document collaboration computing device generates the suggested adaptive digital content based on stylometric model output generated by a stylometric transformation component comprised in a document assistance system, where the model input transmitted to the adaptive digital content processing model was one or more temporally correlated user input step events and/or one or more portions of temporally sequenced digital content associated with the particular collaborative document. The document collaboration computing device can parse one or more portions of temporally sequenced digital content relative to a predefined location within an interactive user interface associated with the particular collaborative document to use as model input.

For instance, in various embodiments, the document collaboration computing device can parse a predefined portion of temporally sequenced digital content relative to the position of a dynamic text insertion cursor on the interactive user interface associated with the collaborative document, where the dynamic text insertion cursor indicates a relative typing position associated with a particular user profile. For example, if a client computing device is generating text in a collaborative document, the document collaboration computing device can parse a portion of temporally sequenced digital content representing an entire sentence stem immediately preceding the dynamic text insertion cursor on the interactive user interface and transmit said portion of temporally sequenced digital content to the document assistance system to be used as model input. In response to receiving stylometric model output generated based on the portion of temporally sequenced digital content, the document collaboration computing device can generate and render suggested adaptive digital content on the interactive user interface, where the suggested adaptive digital content is an organized and structured representation of the stylometric model output. In this example, the document collaboration computing device can render the suggested adaptive digital content immediately after the dynamic text insertion cursor such that the sentence stem is completed to reflect the authoring style related to the user profile associated with the client computing device that is generating the text in the collaborative document.

The client computing device can approve or deny the insertion of the suggested adaptive digital content into the collaborative document. If the client computing device approves the insertion of the suggested adaptive digital content, the document collaboration computing device finalizes and incorporates the suggested adaptive digital content into the collaborative document as temporally sequenced digital content. In various embodiments, the document collaboration computing device can render the suggested adaptive digital content on the interactive user interface in various formats to indicate that the suggested adaptive digital content has not yet been incorporated into the collaborative document.

For instance, the document collaboration computing device can render suggested adaptive digital content related to suggested text in various ways including, but not limited to, various alternate colors relative to the color of the temporally sequenced digital content rendered on the interactive user interface (e.g., rendered in blue if the current text is black), various applied emphases (e.g., italicized text, underlined text, bold text, and/or the like), various opacities (e.g., semi-transparent text to differentiate the suggest adaptive digital content from the temporally sequenced digital content), and/or various animations (e.g., blinking text). Once the suggested adaptive digital content is approved by the client computing device, the alternate formatting of the suggested adaptive digital content is removed, and the suggested adaptive digital content is incorporated into the collaborative document as temporally sequenced digital content.

The term "user profile content corpus" refers to a data construct generated by a document assistance system associated with a document collaboration platform. One or more user profiles can be stored in a document collaboration data repository associated with the document collaboration platform, where the one or more user profiles can be associated with a respective user profile content corpus comprising various portions of data related to, but not limited by, one or more temporally correlated user input step events, one or more portions of temporally sequenced digital content, and/or one or more user passages associated with a particular user profile. A user passage can be a structured segment of text associated with a particular user profile compiled from a collaborative document, such as, for example, an entire sentence or paragraph. The data comprised in the user profile content corpus can be data collected by a document collaboration computing device from one or more collaborative documents that a client computing device associated with the user profile has interacted with and/or contributed to.

One or more portions of data associated with a user profile content corpus can be used to derive a stylometric profile comprised in a document assistance system. Various stylometric transformation algorithms can employ the stylometric profile in order to transform default model output that is generated by an adaptive digital content processing model into stylometric model output such that the stylometric model output reflects an authoring style associated with the user profile. An authoring style can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences) an input language (e.g., Spanish, Italian, or Hindi), a subject matter (e.g., economics, design, engineering, etc.) and/or any combination thereof.

The terms "computer-readable storage medium" refers to a non-transitory, physical, or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a document collaboration platform and/or server system. The document collaboration platform and/or server system is often (but not always) on another computer system, in which case the client accesses the service by way of a network. Client computing devices may include, without limitation, smart phones, tablet computers, laptop computers, wearables, personal computers, enterprise computers, and the like.

The term "document collaboration computing device" refers to a combination of computer hardware and/or software that is configured to provide a service to a client device. An example of a document collaboration computing device is the document collaboration computing device 106 of FIG. 1. In some embodiments, a document collaboration computing device communicates with one or more client computing devices using one or more computer networks.

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

Example Systems and Apparatuses of the Disclosure

FIG. 1 depicts an exemplary document collaboration platform architecture 100 configured for automatic adaptive digital content generation for a collaborative document in accordance with one or more embodiments of the present disclosure. The document collaboration platform architecture 100 comprises client computing device(s) 102*a-n*, a document collaboration platform 104, and a document assistance system 122. The document collaboration platform 104 comprises a document collaboration computing device 106. The document collaboration computing device 106 comprises an input step event component 108, a sequenced digital content component 110, an adaptive digital content component 112, and/or an adaptive digital content processing model training component 114. The document collaboration platform 104 also includes a document collaboration data repository 116 comprising one or more portions of data associated with the document collaboration platform 104, such as user profile data 118 and collaborative document data 120. The document assistance system 122 comprises a document assistant worker 124, a document analyzer 126, adaptive digital content processing model(s) 128, a stylometric transformation component 130, and/or a stylometric profile database 132.

The client computing device(s) 102*a-n*, the document collaboration platform 104, and the document assistance system 122 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMAX network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a WebSocket channel. In some embodiments, the protocol is JSON over RPC, JSON over REST/HTTP, and the like Each of the components comprised in the document collaboration platform architecture 100 are configured to work in tandem to facilitate the collaboration of one or more client computing device(s) 102a-n associated with one or more respective user profiles such that the one or more client computing device(s) 102a-n can simultaneously compose, draft, edit, update, and/or otherwise alter a collaborative document generated and managed by the document collaboration platform 104.

The input step event component 108 is configured to receive and analyze user input data generated by one or more client computing device(s) 102a-n. The user input data can comprise data associated with one or more input commands generated by one or more peripheral input devices capable of manipulating a client computing device. For example, the one or more input commands can be commands issued by a computer mouse, computer keyboard, electronic touchpad, interactive touch display, electronic stylus, and/or the like. The one or more input commands can be directed towards configuring one or more portions of temporally sequenced digital content rendered via an interactive user interface associated with a collaborative document. The input step event component 108 is configured to generate, based on the user input data, one or more temporally correlated user input step events. In various embodiments, the one or more temporally correlated user input step events can contain various portions of metadata related to, but not limited by, an input step event type, an input step event sequence range, a digital content type identifier, one or more portions of digital content data, a user profile identifier, and/or timestamp data associated with the temporally correlated user input step event. The input step event component 108 is configured to transmit the one or more temporal correlated input step events to the sequenced digital content component 110.

The input step event component 108 can determine, based on one or more respective user profile identifiers associated with the one or more temporally correlated user input step events, a corresponding user profile with which to associate the one or more temporally correlated user input step events. For example, the input step event component 108 can update one or more respective user profiles comprised in the user profile data 118 such that the one or more respective user profiles are associated with the corresponding one or more temporally correlated user input step events. The input step event component 108 is configured to store the one or more temporally correlated user input step events in the document collaboration data repository 116 by, for example, updating the collaborative document data 120 to include the one or more temporally correlated user input step events. The input step event component 108 is also configured to transmit the one or more temporally correlated user input step events to the document assistance system 122 for processing and generating adaptive digital content for one or more user profiles collaborating on a particular collaborative document.

The sequenced digital content component 110 is configured to generate temporally sequenced digital content based on one or more temporally correlated user input step events and render the temporally sequenced digital content on one or more interactive user interfaces associated with a collaborative document. For instance, the sequenced digital content component 110 can parse, structure, and/or organize the metadata related to the one or more temporally correlated user input step events associated with one or more user profiles that are simultaneously generating digital content (e.g., text, lists, tables, spreadsheets, graphs, flowcharts, drawings, images and/or the like) for a collaborative document such that the simultaneously generated digital content is correctly organized and rendered as temporally sequenced digital content on one or more respective interactive user interfaces associated with the collaborative document.

The sequenced digital content component 110 is also configured to associate one or more portions of temporally sequenced digital content with one or more respective user profiles based on the user profile identifiers associated with the temporally sequenced digital content. Furthermore, the sequenced digital content component 110 is configured to generate one or more user passages for a user profile based on one or more portions of temporally sequenced digital content. User profiles stored in the document collaboration data repository 116 (e.g., stored in the user profile data 118) can be associated with a respective user profile content corpus comprising various portions of data related to, but not limited by, one or more temporally correlated user input step events, one or more portions of temporally sequenced digital content, and/or one or more user passages associated with a particular user profile. A user passage can be a structured segment of text associated with a particular user profile compiled from a collaborative document, such as, for example, an entire sentence or paragraph. In various embodiments, the sequenced digital content component 110 is also configured to transmit one or more portions of temporally sequenced digital content to the document assistance system 122 for processing and generating adaptive digital content for one or more user profiles collaborating on a particular collaborative document.

The adaptive digital content component 112 is configured to receive one or more portions of adaptive digital content for one or more respective user profiles associated with one or more respective client computing device(s) 102a-n generating digital content for a collaborative document from the document assistance system 122. Based on the one or more portions of adaptive digital content, the adaptive digital content component 112 is configured to generate suggested adaptive digital content reflecting the authoring style related to the one or more respective user profiles associated with one or more respective client computing device(s) 102a-n that are generating digital content in the collaborative document. The adaptive digital content component 112 can render the suggested adaptive digital content immediately after a dynamic text insertion cursor representing the position of a particular user profile on the interactive user interface associated with the collaborative document. A client computing device associated with the particular user profile (e.g., client computing device 102a) can approve or deny the insertion of the suggested adaptive digital content into the collaborative document. If the client computing device approves the insertion of the suggested adaptive digital content, the adaptive digital content component 112 finalizes and incorporates the suggested adaptive digital content into the collaborative document as temporally sequenced digital content.

In various embodiments, the adaptive digital content component 112 can render the suggested adaptive digital content on the interactive user interface in various formats to indicate that the suggested adaptive digital content has not yet been incorporated into the collaborative document. For instance, the adaptive digital content component 112 can render suggested adaptive digital content related to suggested text in various ways including, but not limited to, various alternate colors relative to the color of the temporally sequenced digital content rendered on the interactive user interface (e.g., rendered in blue if the current text is black), various applied emphases (e.g., italicized text, underlined text, bold text, and/or the like), various opacities (e.g., semi-transparent text to differentiate the suggest adaptive digital content from the temporally sequenced digital content), and/or various animations (e.g., blinking text). Once the suggested adaptive digital content is approved by the client computing device (e.g., client computing device 102a), the alternate formatting of the suggested adaptive digital content is removed, and the suggested adaptive digital content is incorporated into the collaborative document as temporally sequenced digital content. In circumstances in which the suggested digital content is approved, the adaptive digital content component 112 is configured to store the updated collaborative document in the document collaboration data repository 116 (e.g., in the collaborative document data 120).

The adaptive digital content processing model training component 114 is configured to generate, train, and/or retrain one or more adaptive digital content processing models (e.g., adaptive digital content processing model(s) 128) for the document assistance system 122. In various embodiments, the one or more adaptive digital content processing model(s) 128 can be machine learning models configured based on an artificial neural network (ANN), a recurrent neural network (RNN), a convolutional neural network (CNN), a natural language processing (NLP) model, and/or any other relevant machine learning model configured to employ artificial intelligence and/or machine reasoning to generate model output based on model input provided by a document collaboration computing device 106.

One or more adaptive digital content processing model(s) 128 can be trained based on one or more portions of data comprised in a document collaboration data repository 116 associated with a particular document collaboration platform 104. For example, an adaptive digital content processing model 128 can be trained based in part on one or more collaborative documents stored by a particular document collaboration platform 104, where the one or more collaborative documents comprise one or more user passages associated with one or more respective user profiles associated with the particular document collaboration platform 104. The default model output generated by an adaptive digital content processing model 128 trained based in part on the one or more collaborative documents can reflect an enterprise authoring style reflecting a defined authoring style associated with a particular company, enterprise, and/or other organizational structure. In this regard, adaptive digital content can be generated to reflect the lexicon, preferred writing style, history, values, mission, objectives, goals, and/or public-facing persona associated with the particular company, enterprise, and/or other organizational structure. Additionally and/or alternatively, the adaptive digital content processing model(s) 128 can be a neural language model trained based in part on a global corpus of documents scraped from the Internet and can generate default model output based on the contents of the global corpus of documents in response to receiving model input associated with the collaborative document from the document collaboration computing device 106.

The document assistance system 122 works in conjunction with the document collaboration platform 104 to generate one or more portions of suggested adaptive digital content for a collaborative document. In various embodiments, the document assistance system 122 is remote from the document collaboration platform 104 and communicates with the document collaboration platform 104 via one or more networks. In various other embodiments, the document assistance system 122 can be embodied by the document collaboration platform 104. The document assistance system 122 is configured to receive one or more portions of data from the document collaboration computing device 106 including, but not limited to, one or more temporally correlated user input step events, one or more portions of temporally sequenced digital content, one or more portions of user profile data 118, and/or one or more portions of collaborative document data 120. The document assistance system 122 is also configured to receive one or more portions of metadata associated with a particular collaborative document such as metadata associated with a relative position of a dynamic text insertion cursor associated with a particular user profile within the collaborative document.

The document assistant worker 124 is configured to ingest one or more temporally correlated user input step events that have been enqueued into in an event processing queue and/or one or more portions of metadata (e.g., one or more user profile identifiers) associated with a particular collaborative document as one or more client computing device(s) 102a-n associated with one or more respective user profiles are simultaneously generating digital content for the particular collaborative document. The document assistant worker 124 is configured to generate collaborator metadata from the one or more temporally correlated user input step events and/or the collaborative document. The collaborator metadata can comprise metadata including, but not limited to, one or more user profiles, a document position associated with one or more dynamic text insertion cursors associated with a respective user profile, and/or other metadata associated with the one or more user profiles.

The document assistant worker 124 is also configured to generate a document object representative of the particular collaborative document based on the contents of the event processing queue and the metadata associated with the particular collaborative document and continues to incrementally build the document object as more temporally correlated user input step events are added to the event processing queue. In this way, the document assistant worker 124 has a real-time state of the particular collaborative document and the current positions of the one or more dynamic text insertion cursors related to the one or more respective user profiles associated with the one or more client computing device(s) 102a-n that are simultaneously generating digital content for the particular collaborative document. The document assistant worker 124 is configured to send the document object to the document analyzer 126.

The document analyzer 126 is configured to determine whether the entire document object should be used to generate adaptive digital content for a particular collaborative document or whether one or more portions of the document object (e.g., one or more portions of temporally sequenced digital content comprised in the collaborative document) should be used to generate the adaptive digital content. For example, if the size of the document object surpasses a predefined document size threshold, the document analyzer 126 can determine to parse a predefined portion of temporally sequenced digital content relative to the position of a dynamic text insertion cursor on the interactive user interface associated with the collaborative document, where the dynamic text insertion cursor indicates a relative typing position associated with a particular user profile.

For example, if a client computing device 102a is generating text in a collaborative document, the document analyzer 126 can parse a portion of temporally sequenced digital content representing an entire sentence stem immediately preceding the dynamic text insertion cursor on the interactive user interface and transmit said portion of temporally sequenced digital content to the adaptive digital content processing model(s) 128 to be used as model input. In various embodiments, the predefined portion of temporally sequenced digital content relative to a particular dynamic text insertion cursor which the document analyzer 126 parses to use as model input can be configured to be predefined number of words, sentences, paragraphs, pages, and/or the like relative to the position of the dynamic text insertion cursor.

The adaptive digital content processing model(s) 128 can be machine learning models configured based on an artificial neural network (ANN), a recurrent neural network (RNN), a convolutional neural network (CNN), a natural language processing (NLP) model, and/or any other relevant machine learning model configured to employ artificial intelligence and/or machine reasoning to generate model output based on model input provided by a document collaboration computing device 106.

One or more adaptive digital content processing model(s) 128 can be trained based on one or more portions of data comprised in a document collaboration data repository 116 associated with a particular document collaboration platform 104. For example, an adaptive digital content processing model 128 can be trained based in part on one or more collaborative documents stored by a particular document collaboration platform 104, where the one or more collaborative documents comprise one or more user passages associated with one or more respective user profiles associated with the particular document collaboration platform 104. The default model output generated by an adaptive digital content processing model 128 trained based in part on the one or more collaborative documents can reflect an enterprise authoring style reflecting a defined authoring style associated with a particular company, enterprise, and/or other organizational structure. In this regard, adaptive digital content can be generated to reflect the lexicon, preferred writing style, history, values, mission, objectives, goals, and/or public-facing persona associated with the particular company, enterprise, and/or other organizational structure.

Additionally and/or alternatively, the adaptive digital content processing model 128 can be a neural language model trained based in part on a global corpus of documents scraped from the Internet and can generate default model output based on the contents of the global corpus of documents in response to receiving model input associated with the collaborative document from the document collaboration computing device 106.

The stylometric transformation component 130 is configured to execute one or more stylometric transformation algorithms by one or more machine-learning-based neural language models, where the stylometric transformation algorithms are directed towards converting the default model output of an adaptive digital content processing model 128 into adaptive digital content that is representative of an authoring style associated with one or more user profiles. For instance, based on the predefined portion of the document object transmitted by the document analyzer 126, the adaptive digital content processing model(s) 128 can generate default model output. The stylometric transformation component 130 can receive the default model output from the adaptive digital content processing model(s) 128 and determine a relevant stylometric profile from a plurality of stylometric profiles comprised in a stylometric profile database 132 based on one or more pieces of metadata associated with the document object.

Based on a stylometric feature vector associated with the determined stylometric profile, the stylometric transformation component 130 can employ the one or more machine-learning-based neural language models to transform the default model output such that the stylometric model output is representative of an authoring style associated with the one or more user profiles associated with the corresponding collaborative document. An authoring style associated with a particular user profile can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences) an input language (e.g., Spanish, Italian, or Hindi), a subject matter (e.g., economics, design, engineering, etc.) a subject matter (e.g., economics, design, engineering, etc.) and/or any combination thereof. The adaptive digital content component 112 can generate suggested adaptive digital content based on the stylometric model output and render the suggested adaptive digital content for the particular user profile on one or more interactive user interfaces associated with the collaborative document.

The stylometric profile database 132 comprises one or more stylometric profiles associated with one or more user profiles related to the document collaboration platform 104. A stylometric profile is an electronically managed data object comprising one or more portions of metadata representative of an authoring style associated with one or more user profiles stored in a document collaboration data repository 116 of a document collaboration platform 104. For example, a stylometric profile comprises a stylometric feature set related to, but limited by, a readability index, sentence averaging counts (e.g., average words, characters, punctuation marks, emoticons, and/or the like), a grammatical profile (e.g., parts of speech, adjectives per sentence, and/or the like), and/or a language variance profile (e.g., function words used, business words used, academic terms used, and/or the like). The stylometric feature set associated with a particular user profile can be used in part by the stylometric transformation component 130 to transform default model output generated by the adaptive digital content processing model 128 into stylometric model output that is representative of the authoring style associated with the particular user profile.

In some scenarios, only one user profile will be associated with a particular stylometric profile, while in other scenarios, multiple user profiles can be associated to a stylometric profile. In various embodiments, stylometric profiles can be generated for individual user profiles as well as combinations of two or more user profiles associated with the document collaboration platform 104, such that a combined authoring style representative of the two or more user profiles can be used to transform the default model output of the adaptive digital content processing model 128 while two or more client computing device(s) 102a-n associated with the two or more user profiles are simultaneously generating text in a collaborative document.

Figure 2:
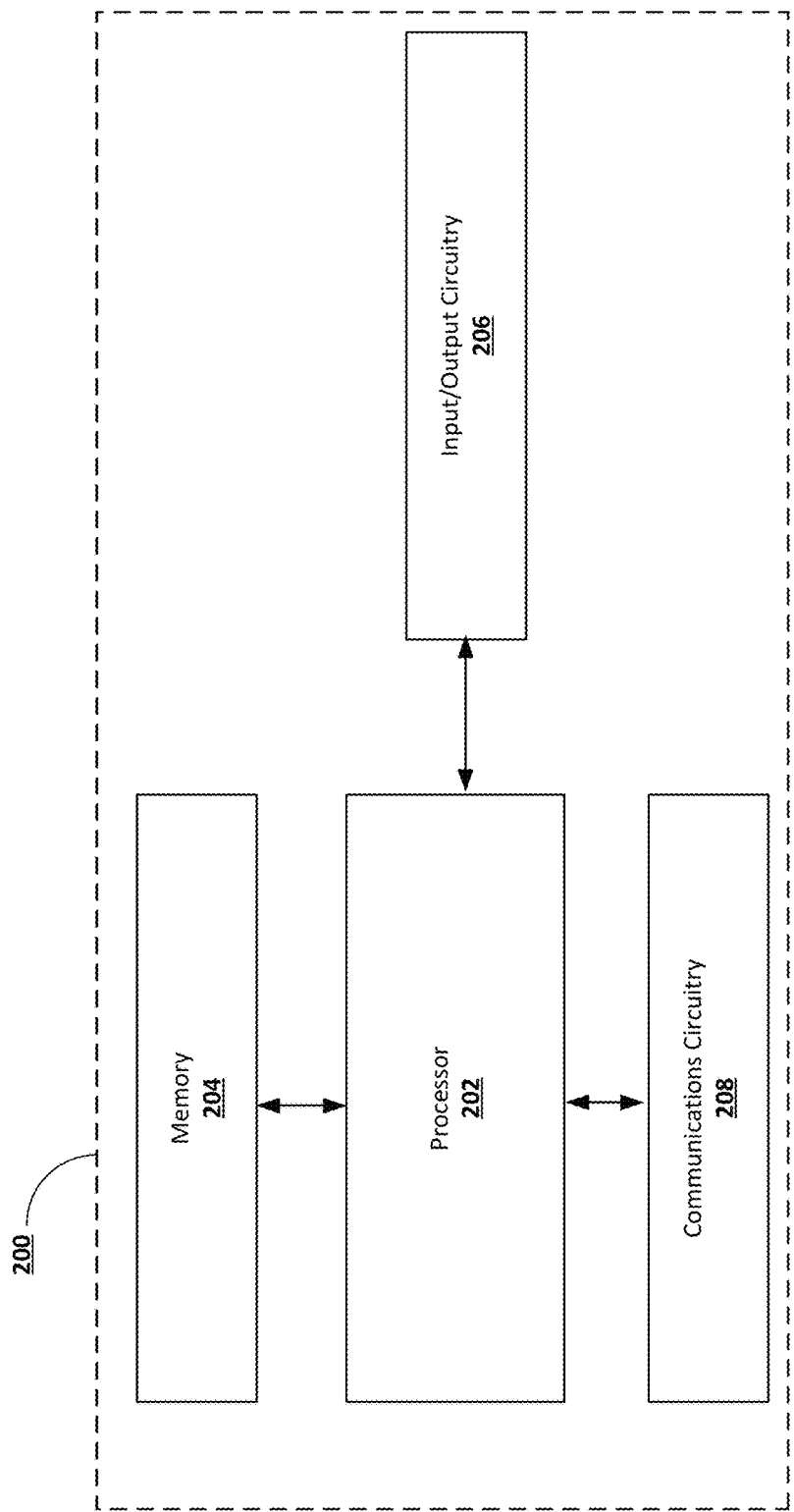
FIG. 2 is a block diagram of an exemplary document collaboration computing device structured in accordance with one or more embodiments of the present disclosure.

FIG. 2 illustrates a block diagram 200 of an exemplary document collaboration computing device 106 structured in accordance with one or more embodiments of the present disclosure. The document collaboration computing device 106 may be embodied by one or more computing systems. The document collaboration computing device 106 may include processor 202, memory 204, input/output circuitry 206, and communications circuitry 208. The document collaboration computing device 106 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the document collaboration computing device 106 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the document collaboration computing device 106. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of document collaboration computing device 106. In some embodiments, one or more external systems (such as a remote cloud computing and/or data storage system) may also be leveraged to provide at least some of the functionality discussed herein.

Figure 3:
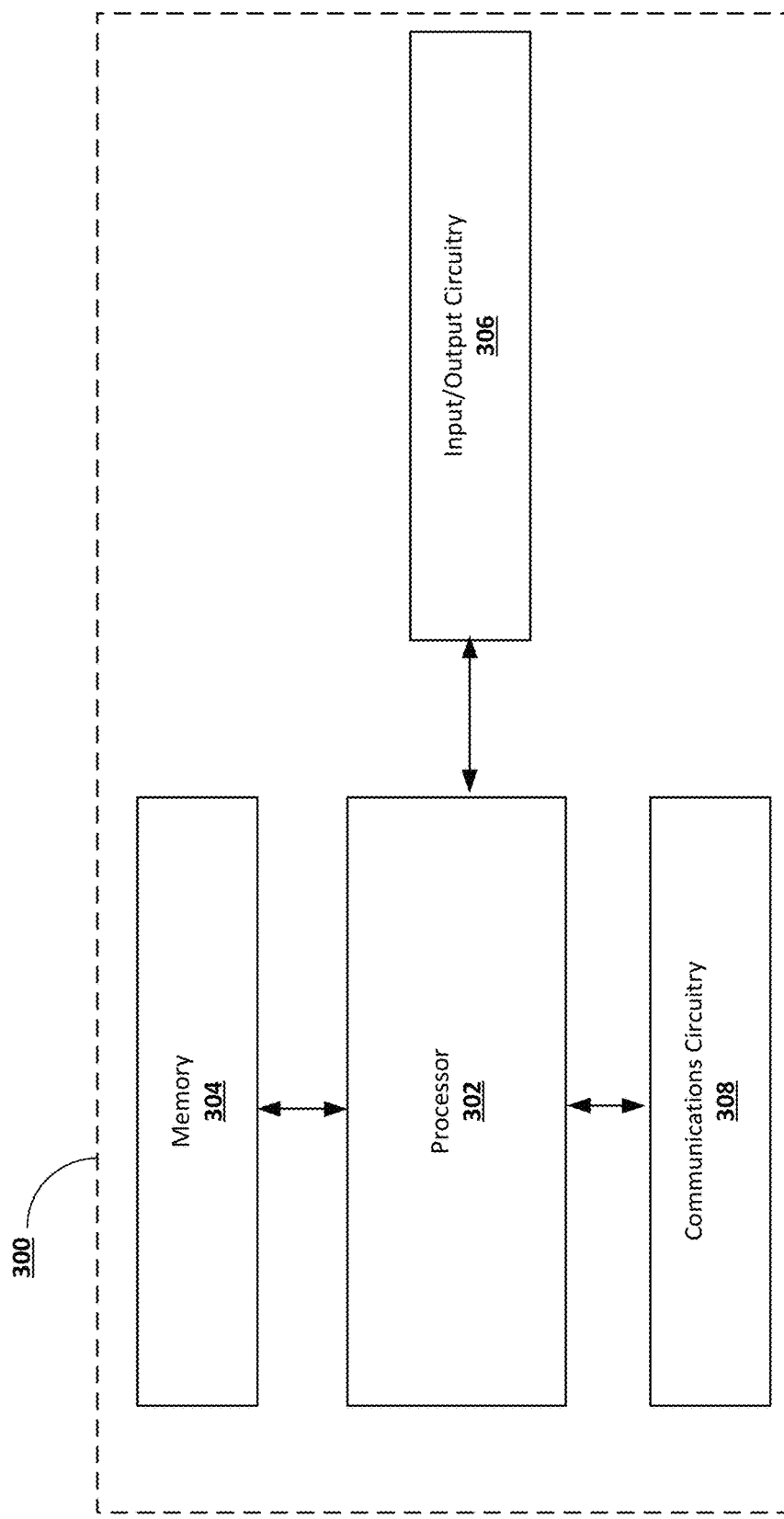
FIG. 3 is a block diagram of an exemplary client computing device structured in accordance with one or more embodiments of the present disclosure.

FIG. 3 illustrates a block diagram 300 of exemplary client computing device(s) 102a-n structured in accordance with one or more embodiments of the present disclosure. The client computing device(s) 102a-n may be embodied by one or more computing systems. The client computing device(s) 102a-n may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the client computing device(s) 102a-n to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the client computing device(s) 102a-n may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the client computing device(s) 102a-n are embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the client computing device(s) 102a-n. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of client computing device(s) 102a-n. In some embodiments, one or more external systems (such as a remote cloud computing and/or data storage system) may also be leveraged to provide at least some of the functionality discussed herein.

Example Data Flows of the Disclosure

Figure 4:
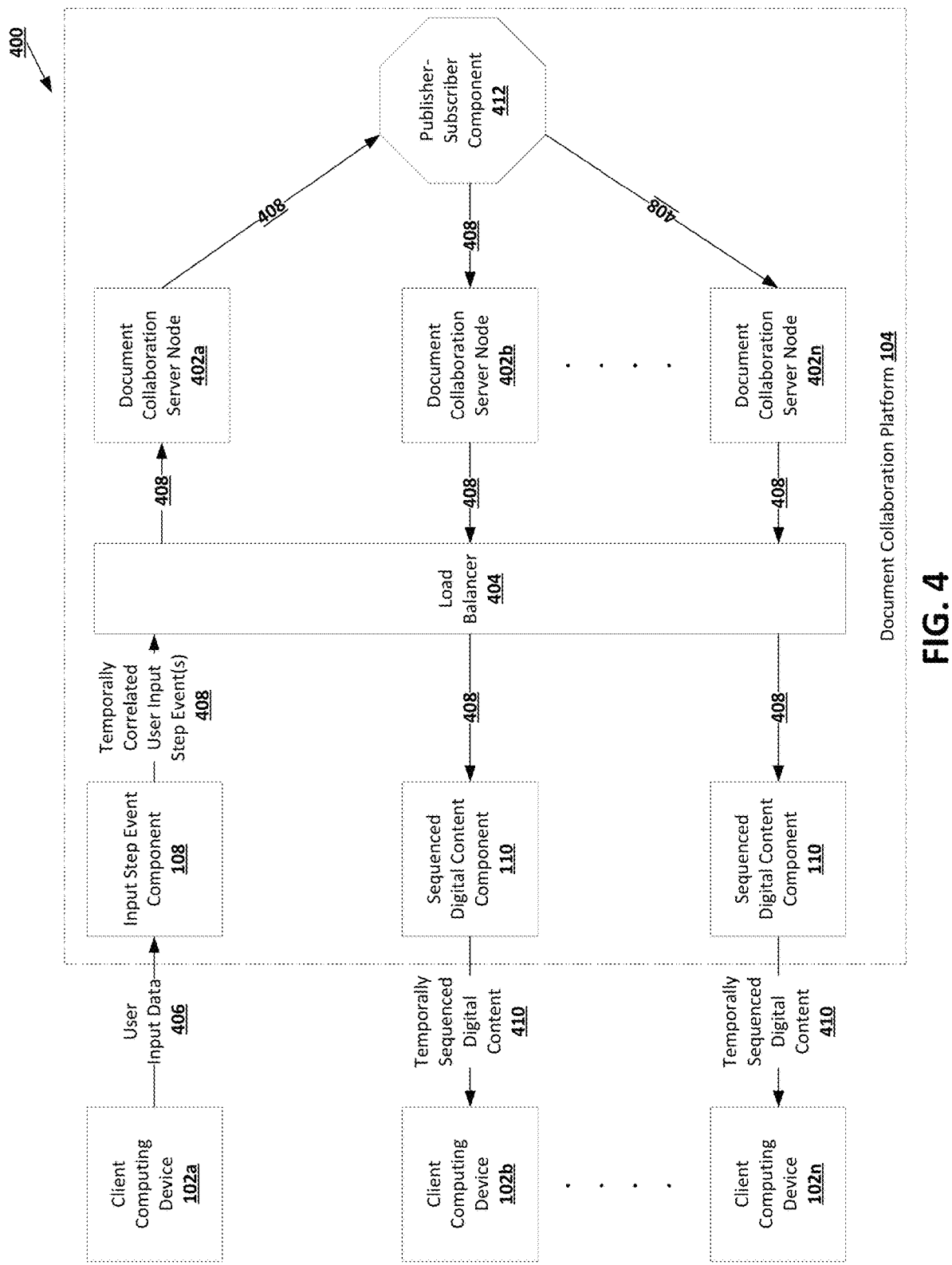
FIG. 4 illustrates an exemplary data flow diagram for one or more client computing devices simultaneously generating digital content on a collaborative document in accordance with one or more embodiments of the present disclosure.

FIG. 4 illustrates a data flow diagram 400 for one or more client computing device(s) 102a-n simultaneously generating digital content for a collaborative document in accordance with one or more embodiments of the present disclosure. Specifically, the data flow diagram 400 depicts how the flow of user input data 406 from client computing device 102a to the document collaboration platform 104 is subsequently transformed into temporally correlated user input step event(s) 408, and ultimately transformed into temporally sequenced digital content 410 to be broadcast and rendered on the client computing device(s) 102a-n via one or more respective interactive user interfaces associated with the collaborative document. In order for multiple client computing device(s) 102a-n associated with multiple respective user profiles to collaborate successfully on the same collaborative document, each interactive user interface associated with the collaborative document rendered on the respective client computing device(s) 102a-n must display the same document state, and each contribution from the respective user profiles must be incorporated into the collaborative document in sequence.

When one or more client computing device(s) 102a-n initiate a collaborative editing session for a particular collaborative document, one or more low-latency communication protocols can be employed to establish one or more low-latency connections with the document collaboration platform 104. The low-latency communication connections are used to facilitate communication between the one or more client computing device(s) 102a-n and the document collaboration platform 104. In some scenarios, one or more document collaboration server node(s) 402a-n associated with the document collaboration platform 104 can be employed to establish a low-latency communication connection with the one or more respective client computing device(s) 102a-n. It will be appreciated that the document collaboration platform 104 can be configured to use one or more low-latency communications protocols to maintain a near real-time connection with one or more client computing device(s) 102a-n. Some non-limiting examples of low-latency communications protocols that can be utilized by the document collaboration platform 104 include communications protocols that employ WebSocket, WebTransport, HTTP Long Polling, and/or Web Real-Time Communication (WebRTC) techniques.

As illustrated in FIG. 4, client computing device 102*a* can transmit one or more portions of user input data 406 to the input step event component 108 associated with the document collaboration platform 104. The user input data 406 can comprise data associated with one or more input commands generated by one or more peripheral input devices capable of manipulating the client computing device 102*a* (e.g., via input/output circuitry 306). For example, the one or more input commands can be commands issued by a computer mouse, computer keyboard, electronic touchpad, interactive touch display, electronic stylus, and/or the like.

It will be appreciated that when one or more client computing device(s) 102*a-n* are simultaneously generating digital content for the collaborative document during the collaborative editing session, the one or more client computing device(s) 102*a-n* can simultaneous generate user input data 406 to be processed and broadcast as one or more temporally correlated user input step event(s) 408, and ultimately transformed into temporally sequenced digital content 410 to be rendered in near real time on each of the respective interactive user interfaces associated with the one or more client computing device(s) 102*a-n* engaged in the collaborative editing session.

The input step event component 108 is configured to generate, based on the user input data 406, one or more temporally correlated user input step event(s) 408. Referencing FIGS. 11A-B, two operational examples are provided representing the one or more temporally correlated user input step event(s) 408 generated based on the user input data 406 generated by two client computing devices (e.g., client computing devices 102*a* and 102*b* respectively) while simultaneously generating text for a collaborative document. In various embodiments, the one or more temporally correlated user input step event(s) 408 can contain various portions of metadata related to, but not limited by, an input step event type 1102, an input step event sequence range 1104, a digital content type identifier 1106, one or more portions of digital content data 1108, a user profile identifier 1110, and/or timestamp data 1112 associated with the temporally correlated user input step event(s) 408. FIG. 11A illustrates a temporally correlated user input step event 408 generated based on user input data 406 from a client computing device (e.g., client computing device 102*a*) associated with a user profile with a user profile identifier 1110 of "User1." FIG. 11B illustrates a temporally correlated user input step event 408 generated based on user input data 406 from a client computing device (e.g., client computing device 102*b*) associated with a user profile with a user profile identifier 1110 of "User2."

In an instance where two client computing devices associated with two respective user profiles are simultaneously generating text in a new collaborative document (e.g., client computing device(s) 102*a* and 102*b* associated with user profiles User1 and User2 respectively), and the first client computing device 102*a* generates user input data 406 correlating to the words "To be" and the second client computing device 102*b* generates user input data 406 correlating to the words "or not to be" the input step event component 108 can generate temporally correlated user input step event(s) 408 associated with the user input data 406 generated by the two client computing devices 102*a* and 102*b* respectively. In one example scenario, the first client computing device 102*a* could have generated the user input data 406 "To be" before the second client computing device 102*b* began generating the second client computing device's respective user input data 406 "or not to be."

In such a scenario, the input step event component 108 can generate a temporally correlated user input step event 408 comprising metadata associated with the user input data 406 generated by the first client computing device 102*a* such that the metadata associated with the input step event sequence range 1104 reflects an ordered number of document positions within the collaborative document, where each character corresponding to each keyboard entry (including spaces) is associated with an integer value associated with a respective document position. In this example, the input step event sequence range 1104 would be 1-6, one document position per each keystroke used to generate the text "To be" in the collaborative document. In this scenario, the second client computing device 102*b* would have generated the user input data 406 corresponding to the text "or not to be" and the input step event component 108 would have generated a temporally correlated user input step event 408 with metadata corresponding to an input step event sequence range 1104 of 7-18.

The sequenced digital content component 110 can organize the temporally correlated user input step event(s) 408 generated by the input step event component 108 based on the respective input step event sequence range(s) 1104 and/or timestamp data 1112 associated with the temporally correlated user input step event(s) 408 to generate temporally sequenced digital content 410 for rendering on the one or more interactive user interfaces associated with the respective client computing device(s) 102*a-n* simultaneously generating digital content for the collaborative document. In this example, the resulting temporally sequenced digital content 410 generated and rendered by the document collaboration platform 104 would be "To be or not to be".

However, it will be appreciated that when two client computing devices (e.g., client computing devices 102*a* and 102*b*) are simultaneously generating digital content for a collaborative document, the two client computing devices may generate user input data 406 at the same time. In such cases, the input step event component 108 may generate temporally correlated user input step event(s) 408 comprising input step event sequence range(s) 1104 that are short, and therefore comprise short, disjointed digital content. However, because of the input step event sequence range 1104 metadata and the corresponding timestamp data 1112, the sequenced digital content component 110 is able to stitch the temporally correlated user input step event(s) 408 together to generate temporally sequenced digital content 410 that is structured and organized. One or more temporally correlated user input step event(s) 408 can be stored in a document collaboration data repository 116 associated with the document collaboration platform 104. In one or more embodiments, one or more temporally correlated user input step event(s) 408 can be associated with one or more respective user profiles stored in the document collaboration data repository 116 based on the user profile identifier(s) 1110 comprised in the one or more temporally correlated user input step event(s) 408.

Returning now to FIG. 4, the temporally correlated user input step event(s) 408 are transmitted to a load balancer 404. The load balancer 404 is configured for sequencing the incoming and outgoing data associated with the collaborative document such as, for example, the one or more temporally correlated user input step event(s) 408 being generated simultaneously by the client computing device(s) 102*a-n*. The temporally correlated user input step event(s) 408 are transmitted to the respective document collaboration server node 402*a* that has established the low-latency communication connection with the client computing device 102*a*. The document collaboration server node 402*a* then transmits the one or more temporally correlated user input step event(s) 408 to publisher-subscriber component 412.

The publisher-subscriber component 412 is configured to receive one or more temporally correlated user input step event(s) 408 related to a particular collaborative document from a client computing device (e.g., client computing device 102*a*) and broadcast the one or more temporally correlated user input step event(s) 408 to one or more respective document collaboration server node(s) (e.g., document collaboration server node(s) 402*b-n*). The one or more respective collaboration server node(s) transmit, by way of the load balancer 404, the one or more temporally correlated user input step event(s) 408 to the sequenced digital content component 110. The sequenced digital content component 110 is configured to generate temporally sequenced digital content 410 based on the one or more temporally correlated user input step event(s) 408 and render the temporally sequenced digital content 410 on the one or more interactive user interfaces associated with the one or more other respective client computing devices currently generating digital content for the same particular collaborative document (e.g., client computing device(s) 102*b-n*). In this manner, each of the client computing device(s) 102*a-n* can view any updates and/or new contributions to the collaborative document made by any of the other client computing device(s) 102*a-n* in near real time.

Figure 5A:
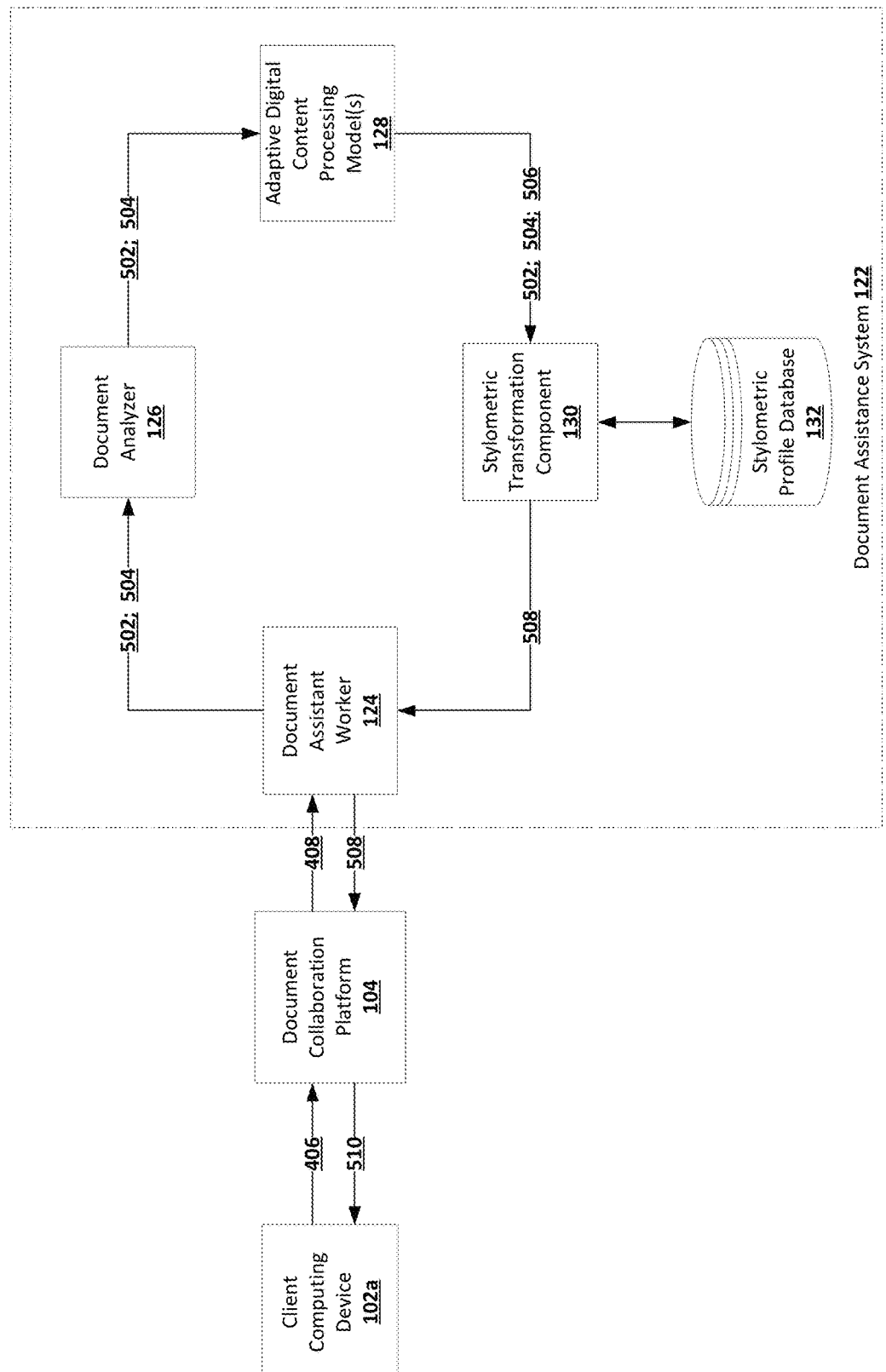
FIGS. 5A-B illustrate exemplary document assistance system architectures configured for generating suggested adaptive digital content in accordance with one or more embodiments of the present disclosure.
Figure 5B:
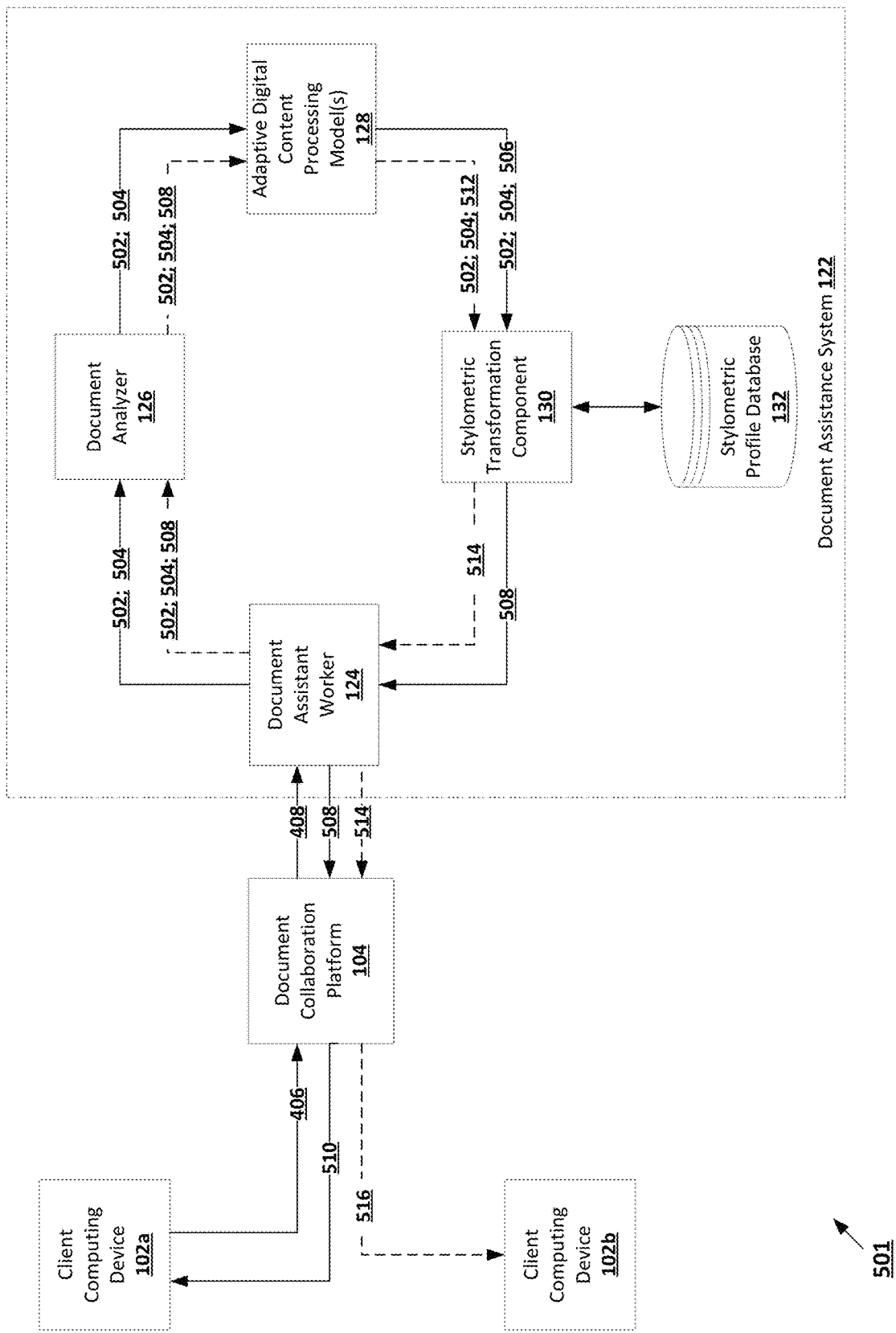

FIGS. 5A-B illustrate exemplary document assistance system architectures 500 and 501 which are configured for automatically generating suggested adaptive digital content in accordance with one or more embodiments of the present disclosure. Specifically, FIG. 5A illustrates an exemplary data flow between a client computing device 102*a*, a document collaboration platform 104, and a document assistance system 122. FIG. 5B illustrates an exemplary data flow between multiple client computing device(s) 102*a* and 102*b*, a document collaboration platform 104, and a document assistance system 122. While FIG. 5B only depicts two client computing devices generating digital content for a collaborative document via the document collaboration platform 104, it will be appreciated that similar methods can be used to accommodate two or more client computing device(s) 102*a-n* and generate suggested adaptive digital content for two or more user profiles associated with each of the two or more respective client computing device(s) 102*a-n*.

With reference to FIG. 5A, the client computing device 102*a* can be associated with a user profile (e.g., by user profile identifier 1110) "User1" and can transmit user input data 406 to the document collaboration platform 104. The document collaboration platform 104 can generate one or more temporally correlated user input step event(s) 408 based on the user input data 406 and can transmit the one or more temporally correlated user input step event(s) 408 (e.g., by way of the document collaboration computing device 106) to the document assistance system 122.

The document assistance system 122 is configured to receive one or more portions of data from the document collaboration computing device 106 including, but not limited to, one or more temporally correlated user input step events, one or more portions of temporally sequenced digital content 410, one or more portions of user profile data 118, and/or one or more portions of collaborative document data 120. The document assistance system 122 is also configured to receive one or more portions of metadata associated with a particular collaborative document such as metadata associated with a relative position of a dynamic text insertion cursor associated with a particular user profile (e.g., User1) within the collaborative document, where the dynamic text insertion cursor indicates a relative typing position associated with the particular user profile.

The document assistant worker 124 is configured to ingest one or more temporally correlated user input step event(s) 408 that have been enqueued into in an event processing queue and/or one or more portions of metadata (e.g., one or more user profile identifier(s) 1110) associated with a particular collaborative document as one or more client computing device(s) 102*a-n* associated with one or more respective user profiles are simultaneously generating digital content for the particular collaborative document. The document assistant worker 124 is configured to generate collaborator metadata 504 from the one or more temporally correlated user input step event(s) 408 and/or the collaborative document. The collaborator metadata 504 can comprise metadata including, but not limited to, one or more user profile identifier(s) 1110, a document position associated with one or more dynamic text insertion cursors associated with a respective user profile identifier 1110, and/or other metadata associated with the one or more user profile identifier(s) 1110.

The document assistant worker 124 is also configured to generate a document object 502 representative of the particular collaborative document based on the contents of the event processing queue and the collaborator metadata 504 associated with the particular collaborative document. The document assistant worker 124 continues to incrementally build the document object 502 as more temporally correlated user input step event(s) 408 are added to the event processing queue. In this way, the document assistant worker 124 has a real-time state of the particular collaborative document and the current positions of the one or more dynamic text insertion cursors related to the one or more respective user profiles associated with the one or more client computing device(s) 102*a-n* that are simultaneously generating digital content for the particular collaborative document. The document assistant worker 124 is configured to send the document object to the document analyzer 126.

The document analyzer 126 is configured to determine whether the entire document object 502 should be used to generate adaptive digital content for a particular collaborative document or whether one or more portions of the document object 502 (e.g., one or more portions of temporally sequenced digital content 410 comprised in the collaborative document) should be used to generate the adaptive digital content. For example, if the size of the document object 502 surpasses a predefined document size threshold, the document analyzer 126 can determine to parse a predefined portion of temporally sequenced digital content 410 relative to the position of a dynamic text insertion cursor on the interactive user interface associated with the collaborative document, where the dynamic text insertion cursor indicates a relative typing position associated with a particular user profile.

For example, if a client computing device 102*a* associated with the user profile User1 is generating text in a collaborative document, the document analyzer 126 can parse a portion of temporally sequenced digital content 410 representing an entire sentence stem immediately preceding the dynamic text insertion cursor on the interactive user interface and transmit said portion of temporally sequenced digital content 410 to the adaptive digital content processing model(s) 128 to be used as model input. In various embodiments, the predefined portion of temporally sequenced digital content 410 relative to a particular dynamic text insertion cursor which the document analyzer 126 parses to use as model input can be configured to be predefined number of words, sentences, paragraphs, pages, and/or the like relative to the position of the dynamic text insertion cursor.

The document analyzer 126 is configured to transmit the predetermined portions of the document object 502 and the collaborator metadata 504 to the adaptive digital content processing model(s) 128 as model input. The adaptive digital content processing model(s) 128 can be machine learning models configured based on an artificial neural network (ANN), a recurrent neural network (RNN), a convolutional neural network (CNN), a natural language processing (NLP) model, and/or any other relevant machine learning model configured to employ artificial intelligence and/or machine reasoning to generate model output based on model input provided by a document collaboration computing device 106.

The adaptive digital content processing model(s) 128 can be trained based on one or more portions of data comprised in a document collaboration data repository 116 associated with a particular document collaboration platform 104. For example, an adaptive digital content processing model 128 can be trained based in part on one or more collaborative documents stored by a particular document collaboration platform 104, where the one or more collaborative documents comprise one or more user passages associated with one or more respective user profiles associated with the particular document collaboration platform 104. The default model output 506 generated by an adaptive digital content processing model 128 trained based in part on the one or more collaborative documents can reflect an enterprise authoring style reflecting a defined authoring style associated with a particular company, enterprise, and/or other organizational structure. In this regard, adaptive digital content (e.g., the default model output 506) can be generated to reflect the lexicon, preferred writing style, history, values, mission, objectives, goals, and/or public-facing persona associated with the particular company, enterprise, and/or other organizational structure. Additionally and/or alternatively, the adaptive digital content processing model 128 can be a neural language model trained based in part on a global corpus of documents scraped from the Internet and can generate default model output based on the contents of the global corpus of documents in response to receiving model input associated with the collaborative document from the document collaboration computing device 106.

The stylometric transformation component 130 is configured to receive the document object 502, the collaborator metadata 504, and the default model output 506 from the adaptive digital content processing model(s) 128. The stylometric transformation component 130 can execute one or more stylometric transformation algorithms by one or more machine-learning-based neural language models, where the stylometric transformation algorithms are directed towards converting the default model output 506 of an adaptive digital content processing model 128 into adaptive digital content that is representative of an authoring style associated with one or more user profiles (e.g., user profile User1).

For instance, based on the predefined portion of the document object 502 transmitted by the document analyzer 126, the adaptive digital content processing model(s) 128 can generate default model output 506. The stylometric transformation component 130 can receive the default model output 506 from the adaptive digital content processing model(s) 128 as well as the collaborator metadata 504 comprising a user profile identifier 1110 associated with User1 and determine that a stylometric profile associated with User1 is the most relevant stylometric profile of a plurality of stylometric profiles comprised in a stylometric profile database 132. The stylometric profile database 132 comprises one or more stylometric profiles associated with one or more user profiles related to the document collaboration platform 104. A stylometric profile is an electronically managed data object comprising one or more portions of metadata representative of an authoring style associated with one or more user profiles stored in a document collaboration data repository 116 of a document collaboration platform 104. In some scenarios, only one user profile will be associated with a particular stylometric profile, while in other scenarios, multiple user profiles can be associated to a stylometric profile. In various embodiments, stylometric profiles can be generated for individual user profiles as well as combinations of two or more user profiles associated with the document collaboration platform 104.

Based on a stylometric feature vector associated with the stylometric profile associated with User1, the stylometric transformation component 130 can employ the one or more machine-learning-based neural language models to transform the default model output 506 into stylometric model output 508. The stylometric model output 508 is representative of an authoring style associated with the user profile User1 generating digital content for the corresponding collaborative document. The stylometric transformation component 130 transmits the stylometric model output 508 to the document assistant worker 124, and the document assistant worker 124 transmits the stylometric model output 508 to the document collaboration platform 104. An adaptive digital content component 112 of the document collaboration platform 104 can generate suggested adaptive digital content 510 for the user profile User1 based on the stylometric model output 508 and render the suggested adaptive digital content 510 proximate to a dynamic text insertion cursor associated with User1 on one or more interactive user interfaces associated with the collaborative document.

The document assistance system 122 can also generate concurrent stylometric model output for multiple client computing device(s) 102a-n, thereby automatically generating multiple portions of adaptive digital content representative of the authoring styles associated with the respective multiple user profiles simultaneously. FIG. 5B illustrates a scenario in which two client computing devices 102a and 102b are simultaneously generating digital content for a collaborative document. For example, client computing device 102a can be associated with user profile User1 and client computing device 102b can be associated with user profile User2. When the document assistant worker 124 receives the stylometric model output 508 associated with User1, the document assistant worker 124 can automatically incorporate the stylometric model output 508 associated with User1 into the document object 502.

The document assistant worker 124 can transmit the document object 502 that has been updated, the collaborator metadata 504 comprising metadata associated with User1 and User2 (e.g., respective user profile identifier(s) 1110, as well as the relative positions of the dynamic text insertion cursors associated with the user profiles), and the stylometric model output 508 associated with User1 to the document analyzer 126. The document analyzer 126 can determine the relevant portions of the document object 502, and transmit the document object 502, the collaborator metadata 504, the stylometric model output 508 associated with User to the adaptive digital content processing model(s) 128. The adaptive digital content processing model(s) 128 can generate default model output 512 based on the document object 502, the collaborator metadata 504, and the stylometric model output 508 associated with User1.

Based on the collaborator metadata 504, the stylometric transformation component 130 can determine a relevant stylometric profile associated with User2. Based on the stylometric profile associated with User2, the document object 502, and the default model output 512, the stylometric transformation component 130 can generate stylometric model output 514 associated with User2, such that the stylometric model output 514 is representative of the authoring style associated with User2. The stylometric transformation component 130 can transmit the stylometric model output 514 to the document assistant worker 124.

The document assistant worker 124 can transmit the stylometric model output 508 associated with User1 and the stylometric model output 514 associated with User2 to the document collaboration platform 104. The adaptive digital content component 112 of the document collaboration platform 104 can generate suggested adaptive digital content 510 for User1 based on the stylometric model output 508 associated with User1 and render the suggested adaptive digital content 510 on an interactive user interface associated with the collaborative document proximate to a dynamic text insertion cursor associated with User1. Simultaneously, the adaptive digital content component 112 of the document collaboration platform 104 can generate suggested adaptive digital content 516 for User2 based on the stylometric model output 514 associated with User2 and render the suggested adaptive digital content 516 on an interactive user interface associated with the collaborative document proximate to a dynamic text insertion cursor associated with User2.

In this manner, the document assistance system 122 can generate adaptive digital content for a first user profile (e.g., stylometric model output 508 associated with User1) while simultaneously generating complementary, concurrent adaptive digital content for a second user profile (e.g., stylometric model output 514 associated with User2) based on the adaptive digital content generated for the first user profile such that the document collaboration platform 104 can simultaneously generate suggested adaptive digital content (e.g., suggested adaptive digital content 510 and 516) for one or more client computing device(s) 102*a-n* associated with one or more respective user profiles (e.g., User1 and User2) in a collaborative document.

Figures 13A, 13B:
FIGS. 13A-C provide operational examples of automatic adaptive digital content generation associated with multiple user profiles based on temporally sequenced digital content in a collaborative document in accordance with one or more embodiments of the present disclosure.
Figure 13C:
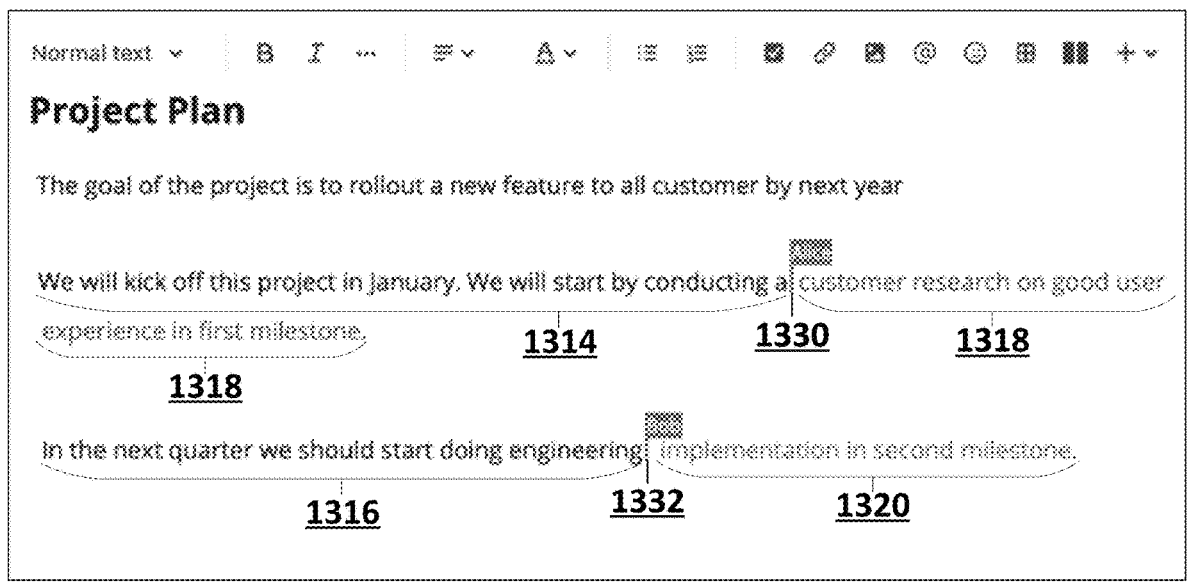

Referencing FIGS. 13A-C, operational examples of the dataflows described above and depicted in FIGS. 5A-B are illustrated. FIGS. 13A-B illustrate scenarios in which different suggested adaptive digital content can be automatically generated for two separate user profiles based on the same temporally sequenced digital content. For example, both FIGS. 13A and 13B depict temporally sequenced digital content 1302 and 1304 where temporally sequenced digital content 1302 and 1304 are sentence stems directly preceding a dynamic text insertion cursor associated with two distinct user profiles. In this example, dynamic text insertion cursor 1330 is associated with a user profile "Alice," and the user profile Alice is associated with a user profile content corpus reflecting many design-focused documents. Similarly, dynamic text insertion cursor 1332 is associated with a user profile "Bob," and the user profile Bob is associated with a user profile content corpus reflecting many software engineering documents. Both user profiles associated with Alice and Bob have unique stylometric profiles reflective of their respective authoring styles that are employed by document assistance system 122 to generate stylometric model output (e.g., stylometric model output 508) which the document collaboration platform 104 can use to generate suggested adaptive digital content.

For instance, the document collaboration platform 104 generated suggested adaptive digital content 1306 and 1308 for the user profile associated with Alice based on the temporally sequenced digital content 1302 and 1304. The suggested adaptive digital content 1306 and 1308 reflects an authoring style derived from the stylometric profile and user profile content corpus associated with Alice's user profile. In contrast, the document collaboration platform 104 generated suggested adaptive digital content 1310 and 1312 for the user profile associated with Bob based on the temporally sequenced digital content 1302 and 1304. The suggested adaptive digital content 1310 and 1312 reflects an authoring style derived from the stylometric profile and user profile content corpus associated with Bob's user profile.

FIG. 13C illustrates an operational example in which two client computing device(s) 102*a-n* associated with two respective user profiles (e.g., user profiles associated with "Alice" and "Bob" respectively) are simultaneously generating digital content for a collaborative document. Based on temporally sequenced digital content 1314 related to the user profile associated with Alice, the document assistance system 122 generated stylometric model output (e.g., stylometric model output 508) and the document collaboration platform 104 generated suggested adaptive digital content 1318 based on said stylometric output. The suggested adaptive digital content 1318 has been rendered proximate to the dynamic text insertion cursor 1330 related to the user profile associated with Alice.

As shown in FIG. 13C, the document collaboration platform 104, in conjunction with the document assistance system 122, can generate complementary, concurrent adaptive content for a second user profile (e.g., the user profile associated with Bob) based on the adaptive digital content generated for a first user profile (e.g., the user profile associated with Alice). For example, the suggested adaptive digital content 1318 associated with Alice recites "customer research on good user experience in first milestone." The document assistance system 122 can determine based on the suggested adaptive digital content 1318 and the temporally sequenced digital content 1314 and 1316 comprised in the collaborative document that there has been mention of a "first milestone," and, as such, generates suggested adaptive digital content 1320 for the second user profile associated with Bob which recites "implementation in second milestone."

In this manner, adaptive digital content representing a particular group intent, or a group context, can be generated by the document collaboration platform 104. In scenarios in which the suggested adaptive digital content (e.g., suggested adaptive digital content 1318) for a first user profile (e.g., the user profile associated with Alice) does not comprise any significant context (e.g., such as a first or second "milestone"), the suggested adaptive digital content (e.g., suggested adaptive digital content 1320) for a second user profile (e.g., the user profile associated with Bob) will be based solely on a stylometric profile associated with the second user profile, and therefore the suggested adaptive digital content associated with the second user profile would only reflect the authoring style associated with the second profile and not be directed towards a group context.

Furthermore, FIG. 13C illustrates that the suggested adaptive digital content 1318 generated for the user profile associated with Alice is directed towards a "good user experience," which is representative of the previously described, design-focused user profile content corpus associated with the user profile related to Alice. Additionally, the suggested adaptive digital content 1320 is directed towards an "implementation in second milestone," which is representative of the previously described, software engineering-focused user profile content corpus associated with the user profile related to Bob. Further still, in some embodiments, a stylometric profile generated based on the two user profiles associated with Alice and Bob can be used to stylometrically transform the default model output (e.g., default model output 506) generated by the adaptive digital content processing model(s) 128 such that the stylometric model output (e.g., stylometric model output 508) is representative of a combined authoring style related to the two user profiles associated with Alice and Bob.

Figure 6:
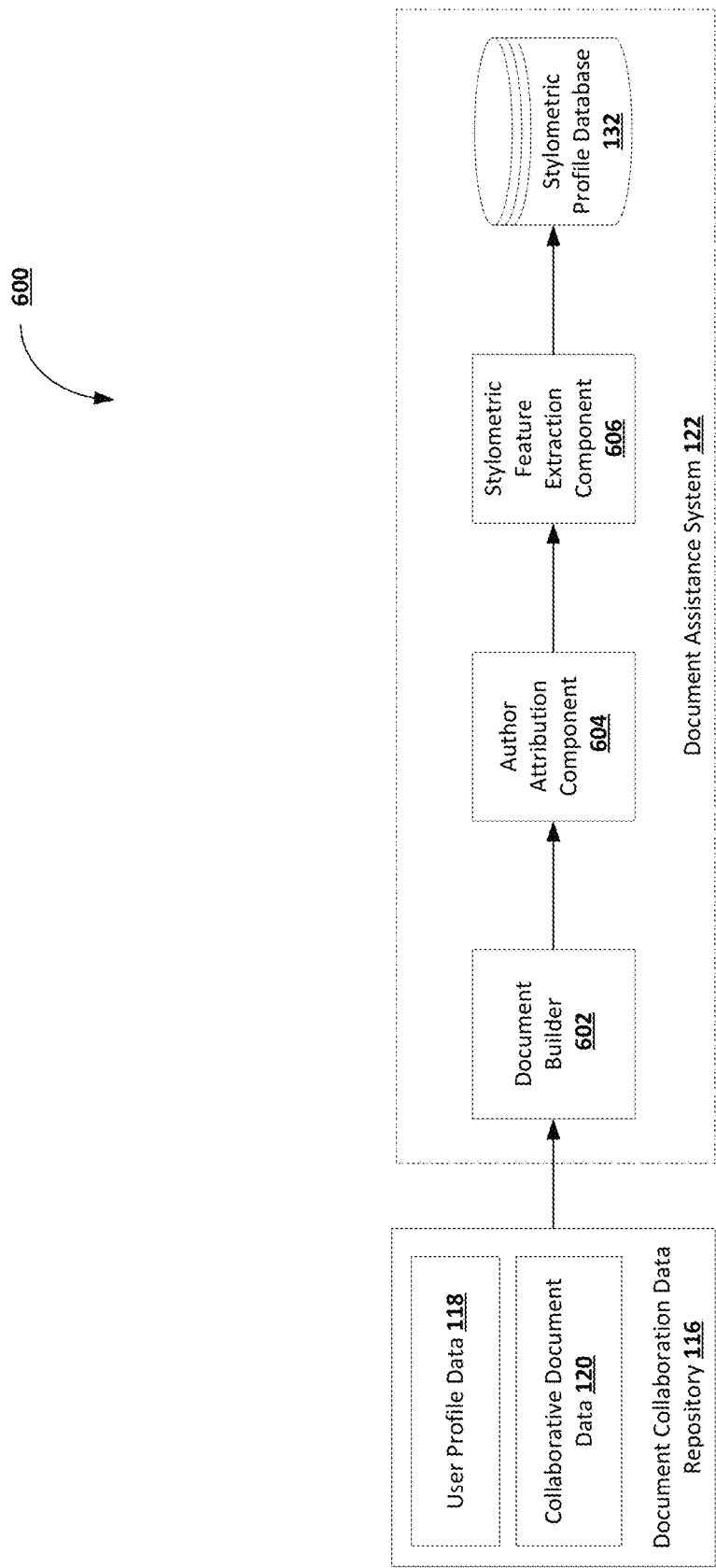
FIG. 6 illustrates an exemplary data flow diagram for generating a stylometric profile in accordance with one or more embodiments of the present disclosure.

FIG. 6 illustrates an exemplary data flow diagram 600 for generating a stylometric profile in accordance with one or more embodiments of the present disclosure. Specifically, FIG. 6 depicts additional components comprised in the document assistance system 122. The document assistance system 122 comprises a document builder 602, and author attribution component 604, and a stylometric feature extraction component 606 with which to generate one or more stylometric profiles associated with one or more respective user profiles comprised in the document collaboration data repository 116.

The document builder 602 extracts collaborative documents and user passages from one or more user profile content corpuses associated with one or more respective user profiles stored in the document collaboration data repository 116. The document builder 602 is configured to compile and structure the extracted collaborative documents and user passages into document objects associated with the one or more user profiles and transmits the document objects to an author attribution component 604. The author attribution component 604 classifies the document objects according to the respective user profiles with which the document objects are associated. In some scenarios, only one user profile can be attributed to a particular document object. In other scenarios, two or more user profiles can be attributed to a particular document object based on which of the two or more user profiles contributed to the collaborative documents and user passages used to generate the document objects. In such scenarios, the author attribution component 604 can extract continuous passages associated with a respective user profile of the two or more user profile associated with the document object. Additionally, the continuous passages associated with the respective user profile can be stored in a user profile content corpus associated with the respective user profile. In this way, stylometric profiles can be generated for individual user profiles as well as combinations of two or more user profiles associated with a document collaboration platform 104.

The stylometric feature extraction component 606 can apply various stylometric feature extraction algorithms and/or machine learning models on the classified document objects in order to generate a set of stylometric features associated with an authoring style related to the one or more user profiles. For example, the stylometric feature extraction component 606 can determine various stylometric features related to, but not limited by, a readability index, sentence averaging counts (e.g., average words, characters, punctuation marks, emoticons, and/or the like), a grammatical profile (e.g., parts of speech, adjectives per sentence, and/or the like), and/or a language variance profile (e.g., function words used, business words used, academic terms used, and/or the like) based on the classified document objects. Based in part on the extracted set of stylometric features, the stylometric feature extraction component 606 can generate a stylometric profile associated with the one or more user profiles associated with the document objects classified by the author attribution component 604.

The stylometric feature set associated with the one or more user profiles can be used in part by a stylometric transformation component 130 to transform default model output (e.g., default model output 506) generated by the adaptive digital content processing model(s) 128 into stylometric model output (e.g., stylometric model output 508) that is representative of the authoring style associated with the one or more user profiles. An authoring style can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences), an input language (e.g., Spanish, Italian, or Hindi), a subject matter (e.g., economics, design, engineering, etc.) and/or any combination thereof that is representative of the one or more user profiles associated with the stylometric profile. One or more stylometric profiles can be stored in the stylometric profile database 132 associated with the document assistance system 122.

Example Processes of the Disclosure

Figure 7A:
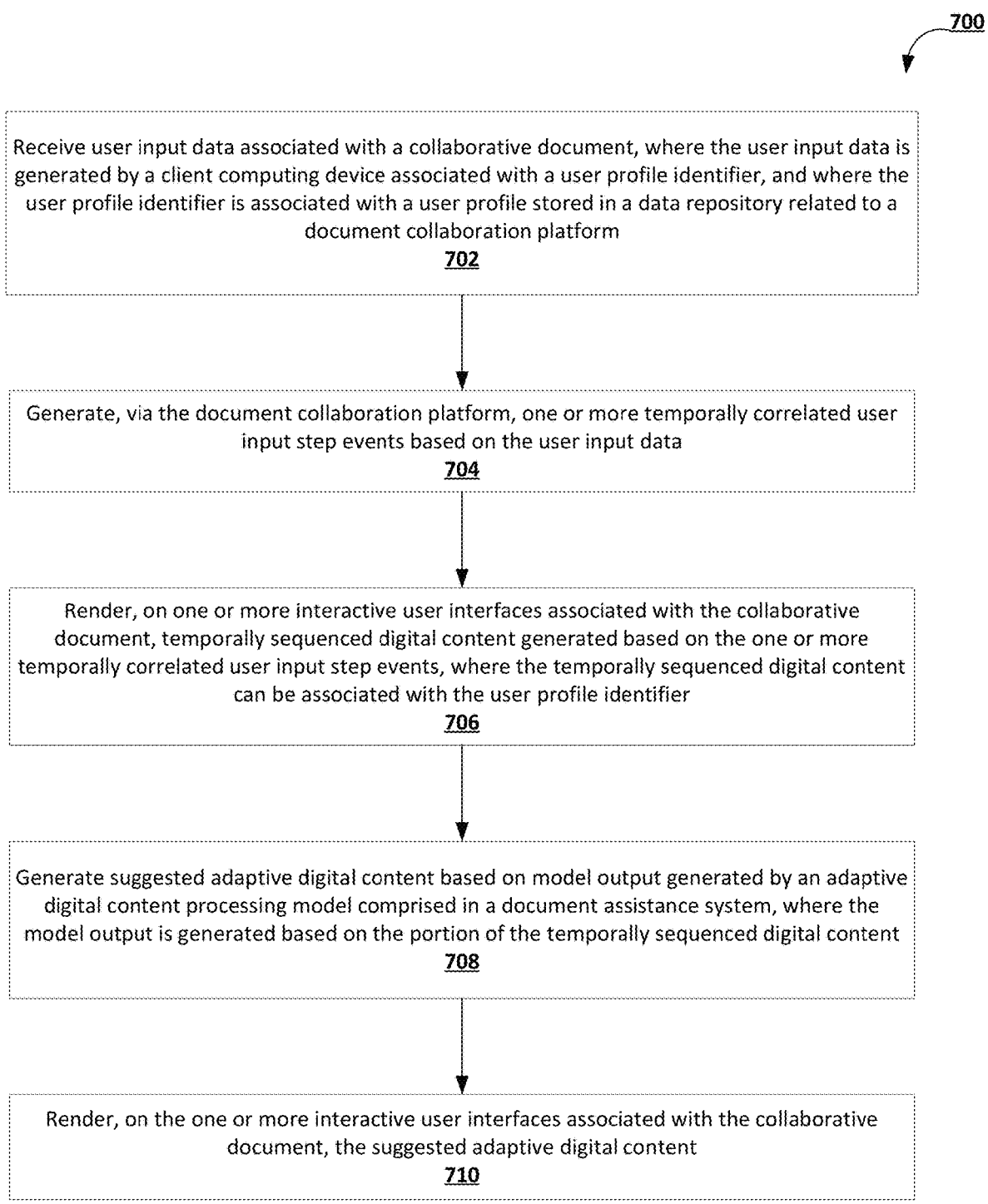
FIGS. 7A-B illustrate a flowchart representing a process 700 for generating adaptive digital content for a particular user profile in a collaborative document in accordance with one or more embodiments of the present disclosure.
Figure 7B:
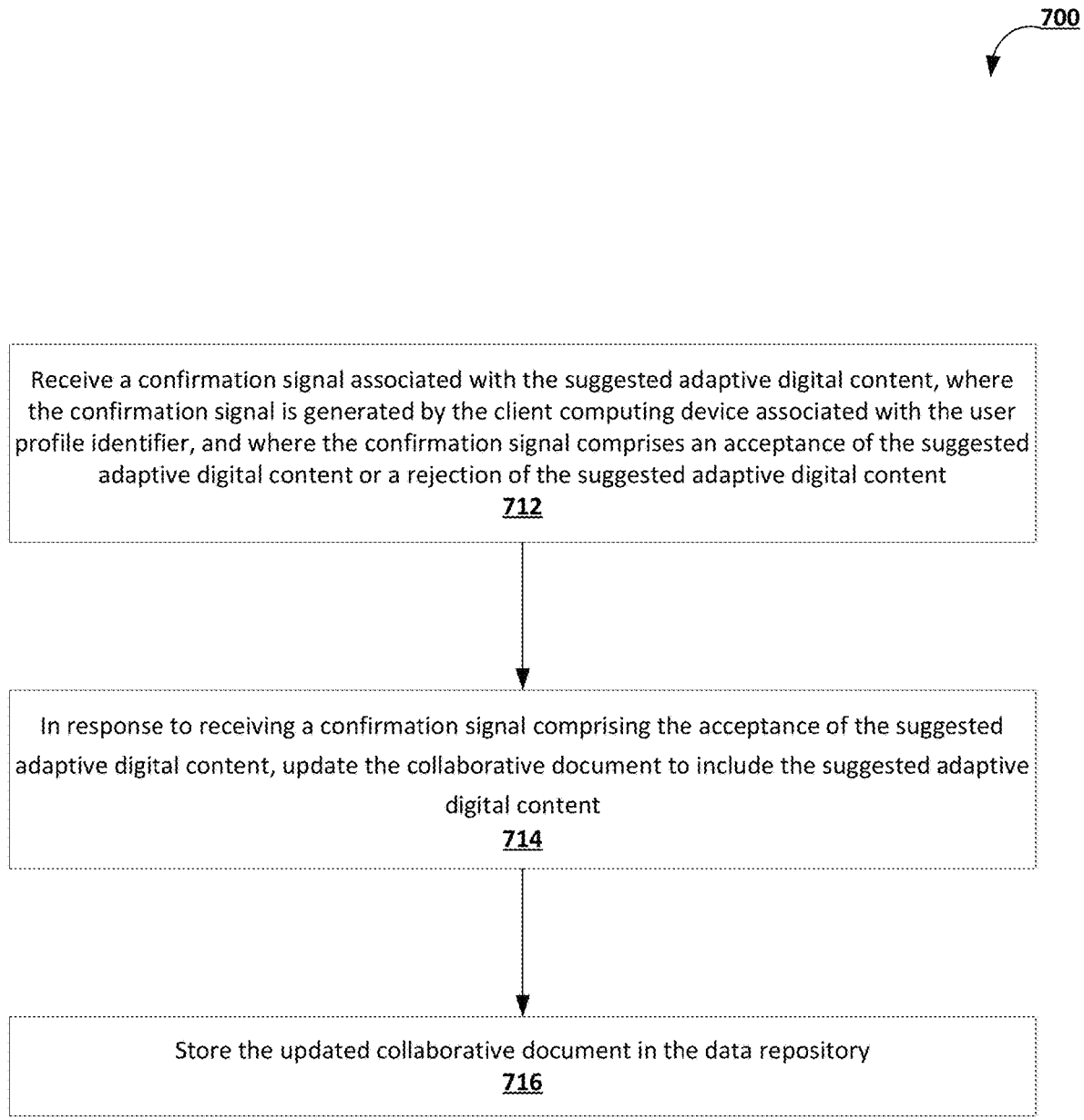

FIGS. 7A-B illustrate a flowchart representing a process for automatically generating adaptive digital content for a particular user profile in a collaborative document in accordance with one or more embodiments of the present disclosure. Specifically, FIGS. 7A-B detail a process 700 for generating suggested adaptive digital content for rendering on one or more interactive user interfaces related to one or more respective user profiles associated with one or more respective client computing device(s) 102*a-n* simultaneously generating digital content for the collaborative document. In some embodiments, the process 700 is embodied by computer program code stored on a non-transitory computer-readable storage medium of a computer program product configured for execution to perform the process as depicted and described.

Additionally or alternatively, in some embodiments, the process 700 is performed by one or more specially configured computing devices, such as the document collaboration computing device 106 alone or in communication with one or more other component(s), device(s), and/or system(s) (e.g., document assistance system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., 104 and integrated with the document assistance system 122). For purposes of simplifying the description, the process 700 is described as performed by and from the perspective of the document collaboration computing device 106.

The process 700 begins at operation 702. At operation 702, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that receives user input data associated with a collaborative document, where the user input data is generated by a client computing device associated with a user profile identifier, and where the user profile identifier is associated with a user profile stored in a data repository related to a document collaboration platform.

For example, the input step event component 108 associated with the document collaboration platform 104 is configured to receive one or more portions of user input data (e.g., user input data 406) from one or more client computing device(s) 102a-n. The user input data (e.g., user input data 406) can comprise data associated with one or more input commands generated by one or more peripheral input devices capable of manipulating the client computing device 102a (e.g., via input/output circuitry 306). For example, the one or more input commands can be commands issued by a computer mouse, computer keyboard, electronic touchpad, interactive touch display, electronic stylus, and/or the like. It will be appreciated that when one or more client computing device(s) 102a-n are simultaneously generating digital content for the collaborative document during a collaborative editing session, the one or more client computing device(s) 102a-n can simultaneously generate user input data (e.g., user input data 406) to be processed and broadcast as one or more temporally correlated user input step events (e.g., temporally correlated user input step event(s) 408).

At operation 704, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates, via the document collaboration platform, one or more temporally correlated user input step events based on the user input data. For example, the input step event component 108 is configured to generate, based on the user input data (e.g., user input data 406), one or more temporally correlated user input step events (e.g., temporally correlated user input step event(s) 408).

In various embodiments, the one or more temporally correlated user input step events (e.g., temporally correlated user input step event(s) 408) can contain various portions of metadata related to, but not limited by, an input step event type 1102, an input step event sequence range 1104, a digital content type identifier 1106, one or more portions of digital content data 1108, a user profile identifier 1110, and/or timestamp data 1112 associated with the temporally correlated user input step event(s) 408. It will be appreciated that when two client computing devices (e.g., client computing devices 102a and 102b) are simultaneously generating digital content for a collaborative document, the two client computing devices may generate user input data (e.g., user input data 406), at the same time. In such cases, the input step event component 108 may generate temporally correlated user input step events (e.g., temporally correlated user input step event(s) 408) comprising short input step event sequence range(s) 1104, and therefore short, disjointed digital content. However, because of the input step event sequence range 1104 metadata and the corresponding timestamp data 1112, the sequenced digital content component 110 is able to stitch the temporally correlated user input step events (e.g., temporally correlated user input step event(s) 408) together to generate structured and organized temporally sequenced digital content (e.g., temporally sequenced digital content 410).

At operation 706, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that renders, on one or more interactive user interfaces associated with the collaborative document, temporally sequenced digital content generated based on the one or more temporally correlated user input step events, where the temporally sequenced digital content can be associated with the user profile identifier.

For example, the sequenced digital content component 110 is configured to generate temporally sequenced digital content (e.g., temporally sequenced digital content 410) based on the one or more temporally correlated user input step events (e.g., temporally correlated user input step event(s) 408) and render the temporally sequenced digital content (e.g., temporally sequenced digital content 410) on the one or more interactive user interfaces associated with the one or more other respective client computing devices currently generating digital content for the same particular collaborative document (e.g., client computing device(s) 102a-n). In this manner, each of the client computing devices (e.g., client computing device(s) 102a-n) can view any updates and/or new contributions to the collaborative document made by any of the other client computing devices in near real time.

At operation 708, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates suggested adaptive digital content based on model output generated by an adaptive digital content processing model comprised in a document assistance system, where the model output is generated based on the portion of the temporally sequenced digital content. For example, the adaptive digital content component 112 is configured to receive one or more portions of adaptive digital content for one or more respective user profiles (e.g., stylometric model output 508) associated with one or more respective client computing device(s) 102a-n generating digital content for a collaborative document from the document assistance system 122. Based on the one or more portions of adaptive digital content, the adaptive digital content component 112 is configured to generate suggested adaptive digital content (e.g., suggested adaptive digital content 510) reflecting the authoring style related to the one or more respective user profiles associated with one or more respective client computing device(s) 102a-n that are generating digital content in the collaborative document.

At operation 710, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that renders, on the one or more interactive user interfaces associated with the collaborative document, the suggested adaptive digital content. For example, the adaptive digital content component 112 can render the suggested adaptive digital content (e.g., suggested adaptive digital content 510) immediately after a dynamic text insertion cursor representing the position of a particular user profile on the interactive user interface associated with the collaborative document.

In various embodiments, the adaptive digital content component 112 can render the suggested adaptive digital content (e.g., suggested adaptive digital content 510) on the interactive user interface in various formats to indicate that the suggested adaptive digital content has not yet been incorporated into the collaborative document. For instance, the adaptive digital content component 112 can render suggested adaptive digital content (e.g., suggested adaptive digital content 510) related to suggested text in various ways including, but not limited to, various alternate colors relative to the color of the temporally sequenced digital content (e.g., temporally sequenced digital content 410) rendered on the interactive user interface (e.g., rendered in blue if the current text is black), various applied emphases (e.g., italicized text, underlined text, bold text, and/or the like), various opacities (e.g., semi-transparent text to differentiate the suggest adaptive digital content from the temporally sequenced digital content), and/or various animations (e.g., blinking text). Once the suggested adaptive digital content is approved by the client computing device (e.g., client computing device 102a), the alternate formatting of the suggested adaptive digital content is removed, and the suggested adaptive digital content is incorporated into the collaborative document as temporally sequenced digital content.

At operation 712, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that receives a confirmation signal associated with the suggested adaptive digital content, where the confirmation signal is generated by the client computing device associated with the user profile identifier, and where the confirmation signal comprises an acceptance of the suggested adaptive digital content or a rejection of the suggested adaptive digital content.

For example, a client computing device associated with the particular user profile (e.g., client computing device 102a) can approve or deny the insertion of the suggested adaptive digital content (e.g., suggested adaptive digital content 510) into the collaborative document. For instance, the client computing device 102a associated with a user profile for which suggested adaptive digital content has been generated can generate user input data (e.g., a predefined keystroke combination such as "Ctrl+TAB") to confirm that the suggested adaptive digital content should be incorporated into the collaborative document.

At operation 714, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that, in response to receiving a confirmation signal comprising the acceptance of the suggested adaptive digital content, updates the collaborative document to include the suggested adaptive digital content. For example, if the client computing device 102a approves the insertion of the suggested adaptive digital content (e.g., suggested adaptive digital content 510), the adaptive digital content component 112 finalizes and incorporates the suggested adaptive digital content into the collaborative document as temporally sequenced digital content (e.g., temporally sequenced digital content 410).

At operation 716, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that stores the updated collaborative document in the data repository. For example, in circumstances in which the suggested digital content is approved, the adaptive digital content component 112 is configured to store the updated collaborative document in the document collaboration data repository 116 (e.g., in the collaborative document data 120).

Figure 8:
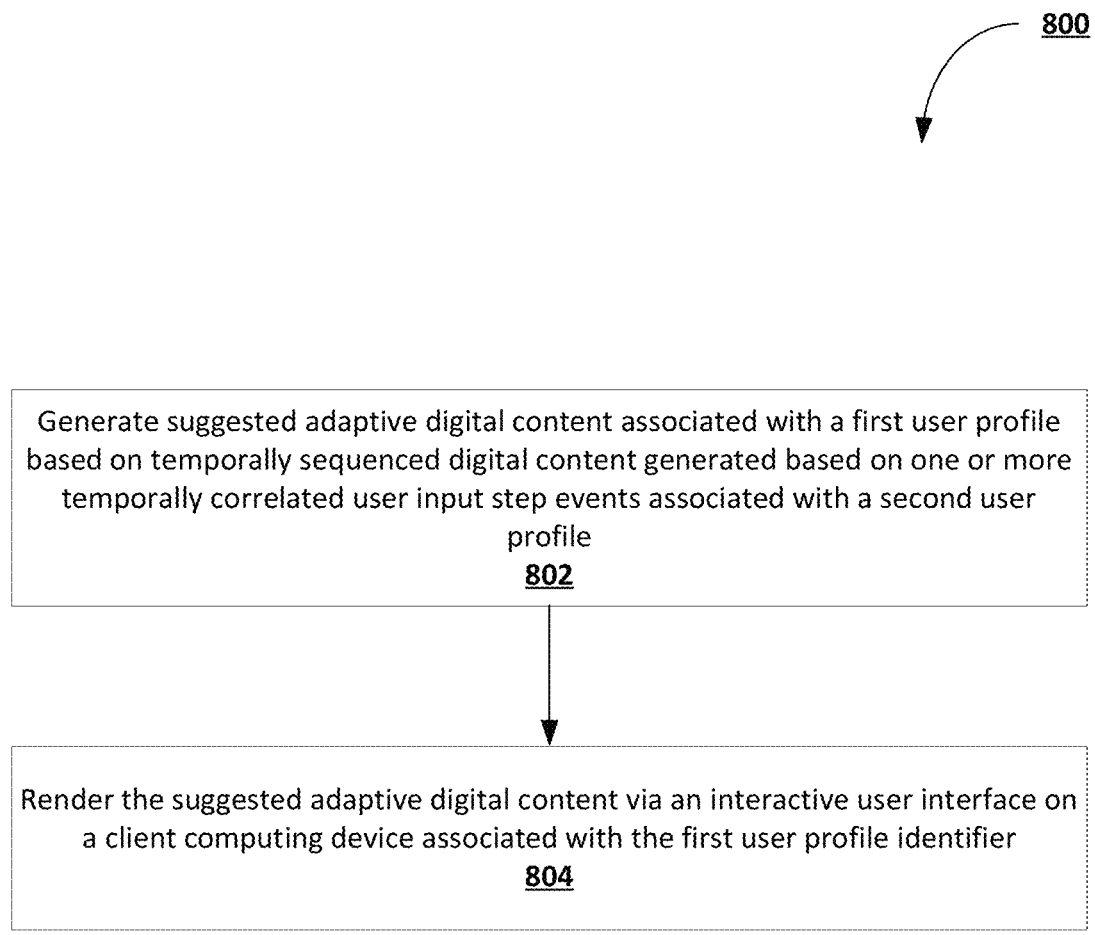
FIG. 8 illustrates a flowchart representing a process 800 for automatically generating suggested adaptive digital content for a first user profile identifier based on one or more temporally correlated user input step events associated with a second user profile identifier in accordance with one or more embodiments of the present disclosure.

FIG. 8 illustrates a flowchart representing a process 800 for automatically generating suggested adaptive digital content for a first user profile identifier based on one or more temporally correlated user input step events associated with a second user profile identifier in accordance with one or more embodiments of the present disclosure. In some embodiments, the process 800 is embodied by computer program code stored on a non-transitory computer-readable storage medium of a computer program product configured for execution to perform the process as depicted and described.

Additionally or alternatively, in some embodiments, the process 800 is performed by one or more specially configured computing devices, such as the document collaboration computing device 106 alone or in communication with one or more other component(s), device(s), and/or system(s) (e.g., document assistance system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., document collaboration computing device 106 embodied by document collaboration platform 104 and integrated with the document assistance system 122). For purposes of simplifying the description, the process 800 is described as performed by and from the perspective of the document collaboration computing device 106.

The process 800 begins at operation 802. At operation 802, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates suggested adaptive digital content associated with a first user profile based on temporally sequenced digital content generated based on one or more temporally correlated user input step events associated with a second user profile. The document assistance system 122 is configured to ingest one or more temporally correlated user input step events (e.g., temporally correlated user input step event(s) 408) that have been enqueued by the document collaboration computing device 106 into in an event processing queue and/or one or more portions of metadata (e.g., one or more user profile identifier(s) 1110) associated with a particular collaborative document as one or more client computing device(s) 102a-n associated with one or more respective user profiles are simultaneously generating digital content for the particular collaborative document.

The document assistance system 122 is also configured to generate collaborator metadata (e.g., collaborator metadata 504) from the one or more temporally correlated user input step events (e.g., temporally correlated user input step event(s) 408) and/or the collaborative document. The document assistance system 122 is also configured to generate a document object (e.g., document object 502) representative of the particular collaborative document based on the contents of the event processing queue and the collaborator metadata (e.g., collaborator metadata 504) associated with the particular collaborative document. The document assistance system 122 can determine to parse a predefined portion of temporally sequenced digital content (e.g., temporally sequenced digital content 410) generated based on the one or more temporally correlated user input steps from the document object (e.g., document object 502) to use as model input for generating adaptive digital content.

For example, if two client computing devices 102a and 102b associated with the user profiles User1 and User1 respectively are simultaneously generating digital content for a collaborative document, the document assistance system 122 can parse a portion of temporally sequenced digital content (e.g., temporally sequenced digital content 410) based on one or more temporally correlated user input step events generated by User1 and transmit said portion of temporally sequenced digital content to the adaptive digital content processing model(s) 128 to be used as model input. Based on the default model output (e.g., default model output 506) generated based on the model input associated with User1, the document assistance system 122 can generate stylometric model output (e.g., stylometric model output 508) for User2. The document collaboration computing device 106 can use the stylometric model output associated with User2 to generate suggested adaptive digital content (e.g., suggested adaptive digital content 510) for User2. In this manner, the document collaboration computing device 106 can generate suggested adaptive digital content for User2 based on the one or more temporally correlated user input step events generated by User1.

At operation 804, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that renders the suggested adaptive digital content via an interactive user interface on a client computing device associated with the first user profile identifier. For example, the document collaboration computing device 106 can render the suggested adaptive digital content (e.g., suggested adaptive digital content 510) on an interactive user interface associated with the collaborative document proximate to a dynamic text insertion cursor associated with User2.

Figure 9:
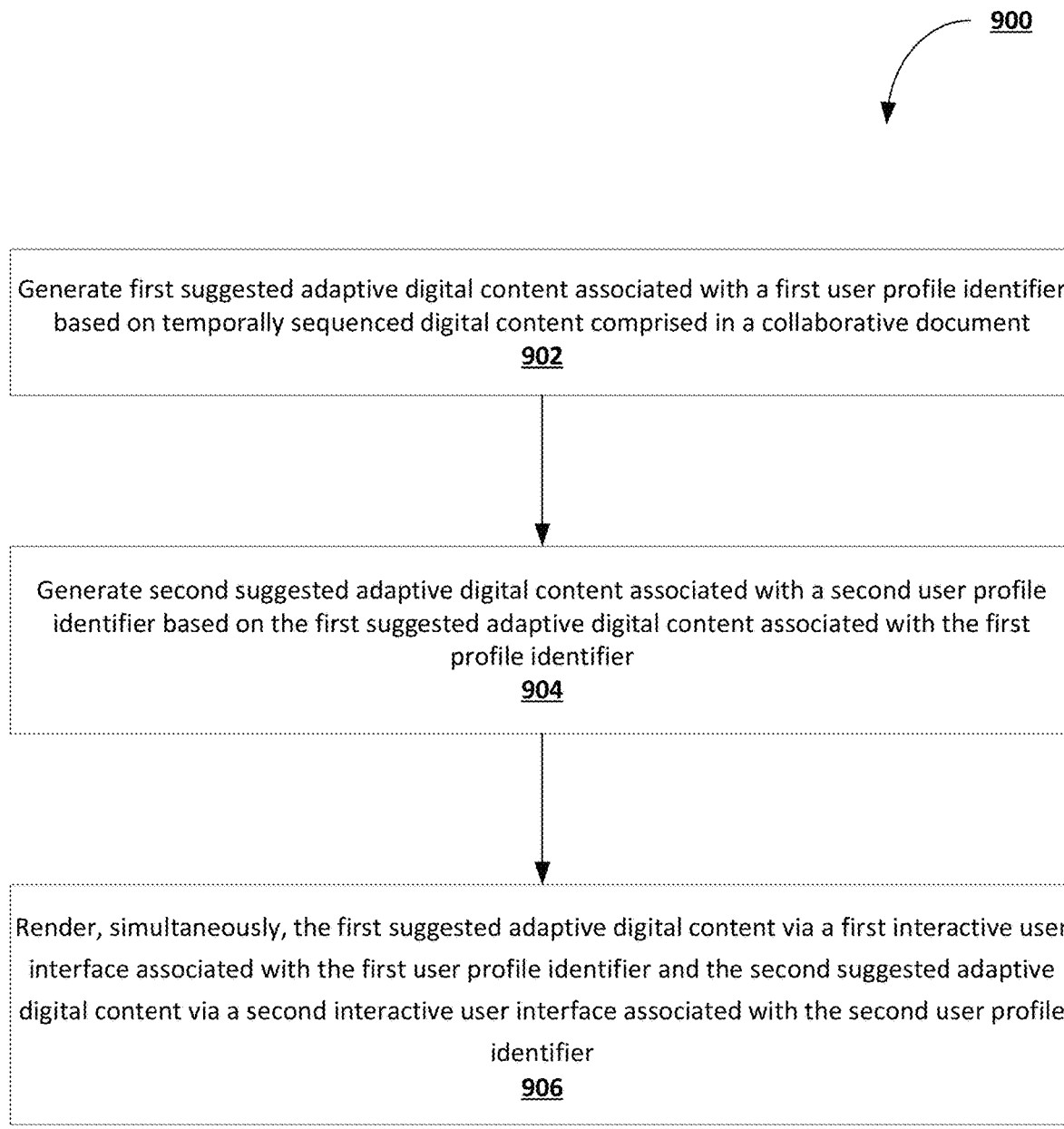
FIG. 9 illustrates a flowchart representing a process 900 for generating first suggested adaptive digital content for a first user profile identifier and automatically generating second suggested adaptive digital content for a second user profile identifier based on the first suggested adaptive digital content in accordance with one or more embodiments of the present disclosure.

FIG. 9 illustrates a flowchart representing a process 900 for automatically generating first suggested adaptive digital content for a first user profile identifier and automatically generating second suggested adaptive digital content for a second user profile identifier based on the first suggested adaptive digital content in accordance with one or more embodiments of the present disclosure. In some embodiments, the process 900 is embodied by computer program code stored on a non-transitory computer-readable storage medium of a computer program product configured for execution to perform the process as depicted and described.

Additionally or alternatively, in some embodiments, the process 900 is performed by one or more specially configured computing devices, such as the document collaboration computing device 106 alone or in communication with one or more other component(s), device(s), and/or system(s) (e.g., document assistance system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., document collaboration computing device 106 embodied by document collaboration platform 104 and integrated with the document assistance system 122). For purposes of simplifying the description, the process 900 is described as performed by and from the perspective of the document collaboration computing device 106.

The process 900 begins at operation 902. At operation 902, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates first suggested adaptive digital content associated with a first user profile identifier based on temporally sequenced digital content comprised in a collaborative document.

As described above with reference to FIG. 5B, the document assistance system 122 is configured to ingest one or more temporally correlated user input step events (e.g., temporally correlated user input step event(s) 408) that have been enqueued by the document collaboration computing device 106 into in an event processing queue and/or one or more portions of metadata (e.g., one or more user profile identifier(s) 1110) associated with a particular collaborative document as one or more client computing device(s) 102a-n associated with one or more respective user profiles are simultaneously generating digital content for the particular collaborative document.

The document assistance system 122 is also configured to generate collaborator metadata (e.g., collaborator metadata 504) from the one or more temporally correlated user input step events (e.g., temporally correlated user input step event(s) 408) and/or the collaborative document. The document assistance system 122 is also configured to generate a document object (e.g., document object 502) representative of the particular collaborative document based on the contents of the event processing queue and the collaborator metadata (e.g., collaborator metadata 504) associated with the particular collaborative document. The document assistance system 122 can determine to parse a predefined portion of temporally sequenced digital content (e.g., temporally sequenced digital content 410) generated based on the one or more temporally correlated user input steps from the document object (e.g., document object 502) to use as model input for generating adaptive digital content. Based on the default model output (e.g., default model output 506) generated based on the model input associated with a first user profile (e.g., User1), the document assistance system 122 can generate stylometric model output (e.g., stylometric model output 508) representing an authoring style associated with User1.

At operation 904, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates second suggested adaptive digital content associated with a second user profile identifier based on the first suggested adaptive digital content associated with the first profile identifier. For example, the document assistance system 122 can automatically incorporate the stylometric model output (e.g., stylometric model output 508) associated with User1 into the document object (e.g., document object 502). The adaptive digital content processing model(s) 128 can generate default model output (e.g., default model output 506) based on the document object (e.g., document object 502), the collaborator metadata (e.g., collaborator metadata 504), and the stylometric model output (e.g., stylometric model output 508) associated with User1.

Based on the collaborator metadata, the document assistance system 122 can determine a relevant stylometric profile associated with User2. Based on the stylometric profile associated with User2, the document object, and the default model output, the document assistance system 122 can generate stylometric model output (e.g., stylometric model output 514) associated with User2, such that the stylometric model output is representative of the authoring style associated with User2. In this manner, the document assistance system 122 can generate adaptive digital content (e.g., stylometric model output 514) for User2 based on the adaptive digital content (e.g., stylometric model output 508) generated for User1.

At operation 904, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that renders, simultaneously, the first suggested adaptive digital content via a first interactive user interface associated with the first user profile identifier and the second suggested adaptive digital content via a second interactive user interface associated with the second user profile identifier.

For example, the document collaboration computing device 106 can generate suggested adaptive digital content (e.g., suggested adaptive digital content 510) for User1 based on the stylometric model output (e.g., stylometric model output 508) associated with User1 and render the suggested adaptive digital content on an interactive user interface associated with the collaborative document proximate to a dynamic text insertion cursor (e.g., dynamic text insertion cursor 1330) associated with User1. Simultaneously, the document collaboration computing device 106 can generate suggested adaptive digital content (e.g., suggested adaptive digital content 516) for User2 based on the stylometric model output (e.g., stylometric model output 514) associated with User2 and render the suggested adaptive digital content on an interactive user interface associated with the collaborative document proximate to a dynamic text insertion cursor (e.g., dynamic text insertion cursor 1332) associated with User2.

In this manner, the document assistance system 122 can generate adaptive digital content for a first user profile (e.g., stylometric model output 508 associated with User1) while simultaneously generating complementary, concurrent adaptive digital content for a second user profile (e.g., stylometric model output 514 associated with User2) based on the adaptive digital content generated for the first user profile such that the document collaboration computing device 106 can simultaneously generate suggested adaptive digital content (e.g., suggested adaptive digital content 510 and 516) for one or more client computing device(s) 102*a-n* associated with one or more respective user profiles (e.g., User1 and User2) in a collaborative document.

Figure 10:
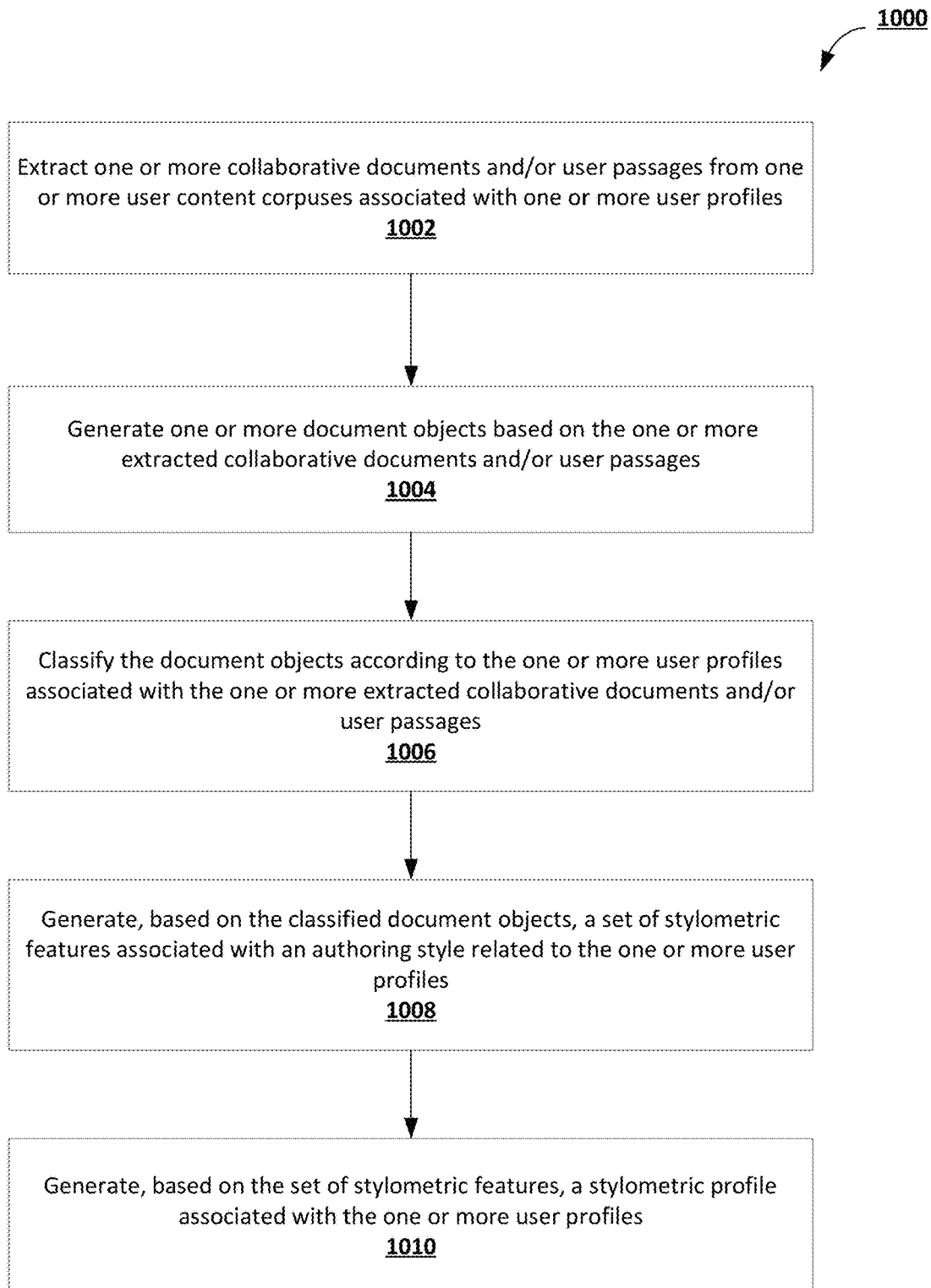
FIG. 10 illustrates a flowchart representing a process 1000 for generating a stylometric profile associated with a user profile in accordance with one or more embodiments of the present disclosure.

FIG. 10 illustrates a flowchart representing a process 1000 for generating a stylometric profile associated with a user profile in accordance with one or more embodiments of the present disclosure. In some embodiments, the process 1000 is embodied by computer program code stored on a non-transitory computer-readable storage medium of a computer program product configured for execution to perform the process as depicted and described.

Additionally or alternatively, in some embodiments, the process 1000 is performed by one or more specially configured computing devices, such as the document collaboration computing device 106 alone or in communication with one or more other component(s), device(s), and/or system(s) (e.g., document assistance system 122). In this regard, in some such embodiments, the document collaboration computing device 106 is specially configured by computer-coded instructions (e.g., computer program instructions) stored thereon, for example in the memory 204 and/or another component depicted and/or described herein and/or otherwise accessible to the document collaboration computing device 106, for performing the operations as depicted and described. In some embodiments, the document collaboration computing device 106 is in communication with one or more external apparatus(es), system(s), device(s), and/or the like, to perform one or more of the operations as depicted and described. For example, the document collaboration computing device 106 in some embodiments is in communication with one or more system(s) integrated with, or embodying, a document collaboration platform (e.g., 104 and integrated with the document assistance system 122). For purposes of simplifying the description, the process 1000 is described as performed by and from the perspective of the document collaboration computing device 106.

The process 1000 begins at operation 1002. At operation 1002, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that extracts one or more collaborative documents and/or user passages from one or more user profile content corpuses associated with one or more user profiles.

For example, a document builder (e.g., document builder 602) can extract collaborative documents and user passages from one or more user profile content corpuses associated with one or more respective user profiles stored in the document collaboration data repository 116. A user profile content corpus can comprise various portions of data related to, but not limited by, one or more temporally correlated user input step events, one or more portions of temporally sequenced digital content, and/or one or more user passages associated with a particular user profile. A user passage can be a structured segment of text associated with a particular user profile compiled from a collaborative document, such as, for example, an entire sentence or paragraph. The data comprised in the user profile content corpus can be data collected by a document collaboration computing device 106 from one or more collaborative documents that a client computing device(s) 102*a-n* associated with the user profile has interacted with and/or contributed to.

At operation 1004, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates one or more document objects based on the one or more extracted collaborative documents and/or user passages. For example, the document builder (e.g., document builder 602) can compile and structure the extracted collaborative documents and user passages into document objects associated with the one or more user profiles and transmit the document objects to an author attribution component (e.g., author attribution component 604).

At operation 1006, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that classifies the document objects according to the one or more user profiles associated with the one or more extracted collaborative documents and/or user passages. For example, an author attribution component (e.g., author attribution component 604) classifies the document objects according to the respective user profiles with which the document objects are associated. In some scenarios, only one user profile can be attributed to a particular document object. In other scenarios, two or more user profiles can be attributed to a particular document object based on which of the two or more user profiles contributed to the collaborative documents and user passages used to generate the document objects. In this way, stylometric profiles can be generated for individual user profiles as well as combinations of two or more user profiles associated with a document collaboration platform 104.

At operation 1008, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates, based on the classified document objects, a set of stylometric features associated with an authoring style related to the one or more user profiles. For example, a stylometric feature extraction component (e.g., stylometric feature extraction component 606) can apply various stylometric feature extraction algorithms and/or machine learning models on the classified document objects in order to generate a set of stylometric features associated with an authoring style related to the one or more user profiles. For example, the stylometric feature extraction component can determine various stylometric features related to, but not limited by, a readability index, sentence averaging counts (e.g., average words, characters, punctuation marks, emoticons, and/or the like), a grammatical profile (e.g., parts of speech, adjectives per sentence, and/or the like), and/or a language variance profile (e.g., function words used, business words used, academic terms used, and/or the like) based on the classified document objects.

At operation 1010, the document collaboration computing device 106 includes means, such as the input step event component 108, the sequenced digital content component 110, the adaptive digital content component 112, the adaptive digital content processing model training component 114, communications circuitry 208, input/output circuitry 206, memory 204, and/or processor 202, or any combination thereof, that generates, based on the set of stylometric features, a stylometric profile associated with the one or more user profiles.

For example, based in part on the extracted set of stylometric features, the stylometric feature extraction component (e.g., stylometric feature extraction component 606) can generate a stylometric profile associated with the one or more user profiles associated with the document objects classified by the author attribution component (e.g., author attribution component 604). The stylometric feature set associated with the one or more user profiles can be used in part by document assistance system 122 to transform default model output (e.g., default model output 506) generated by the adaptive digital content processing model(s) 128 into stylometric model output (e.g., stylometric model output 508) that is representative of the authoring style associated with the one or more user profiles.

An authoring style can be, but is not limited to, a writing style (e.g., authoritative, formal, casual, etc.), a spelling style (e.g., use of abbreviations), a vocabulary style (e.g., simple or complex vocabulary), a grammar style (e.g., strict use grammatical rules), a language style (e.g., use of slang), a phrasing style (e.g., structure and/or length of sentences), an input language (e.g., Spanish, Italian, or Hindi), a subject matter (e.g., economics, design, engineering, etc.) and/or any combination thereof that is representative of the one or more user profiles associated with the stylometric profile. One or more stylometric profiles can be stored in the stylometric profile database 132 associated with the document assistance system 122.

Operational Examples of the Disclosure

FIGS. 11A-B, previously described herein, depict operational examples of temporally correlated user input step event(s) 408 in accordance with one or more embodiments of the present disclosure. In various embodiments, the one or more temporally correlated user input step event(s) 408 can contain various portions of metadata related to, but not limited by, an input step event type 1102, an input step event sequence range 1104, a digital content type identifier 1106, one or more portions of digital content data 1108, a user profile identifier 1110, and/or timestamp data 1112 associated with the temporally correlated user input step event(s) 408. FIG. 11A illustrates a temporally correlated user input step event 408 generated based on user input data 406 from a client computing device (e.g., client computing device 102a) associated with a user profile with a user profile identifier 1110 of "User1." FIG. 11B illustrates a temporally correlated user input step event 408 generated based on user input data 406 from a client computing device (e.g., client computing device 102b) associated with a user profile with a user profile identifier 1110 of "User2."

Figure 12A:
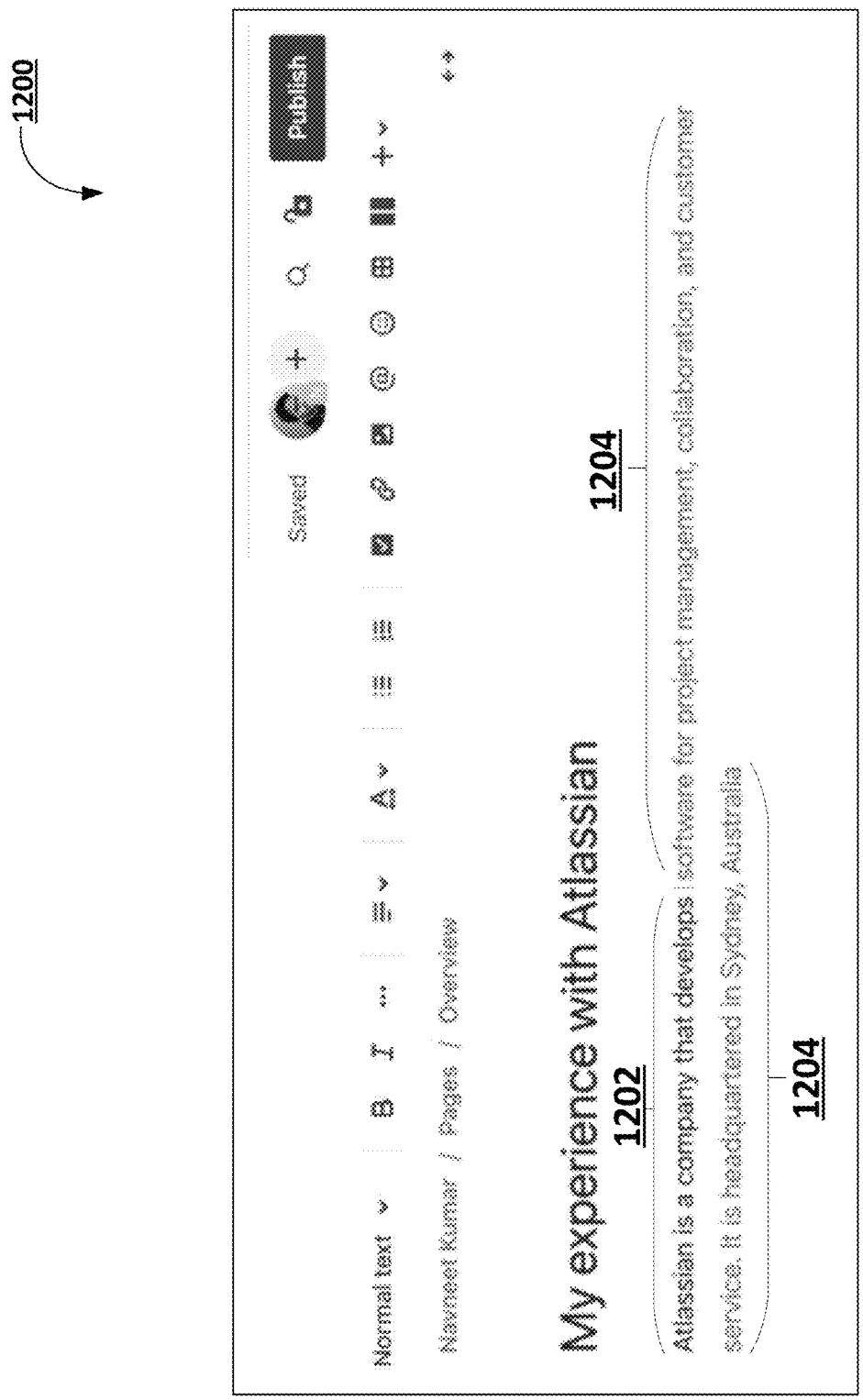
FIGS. 12A-B provide operational examples of automatic adaptive digital content generation for a collaborative document in accordance with one or more embodiments of the present disclosure.
Figure 12B:
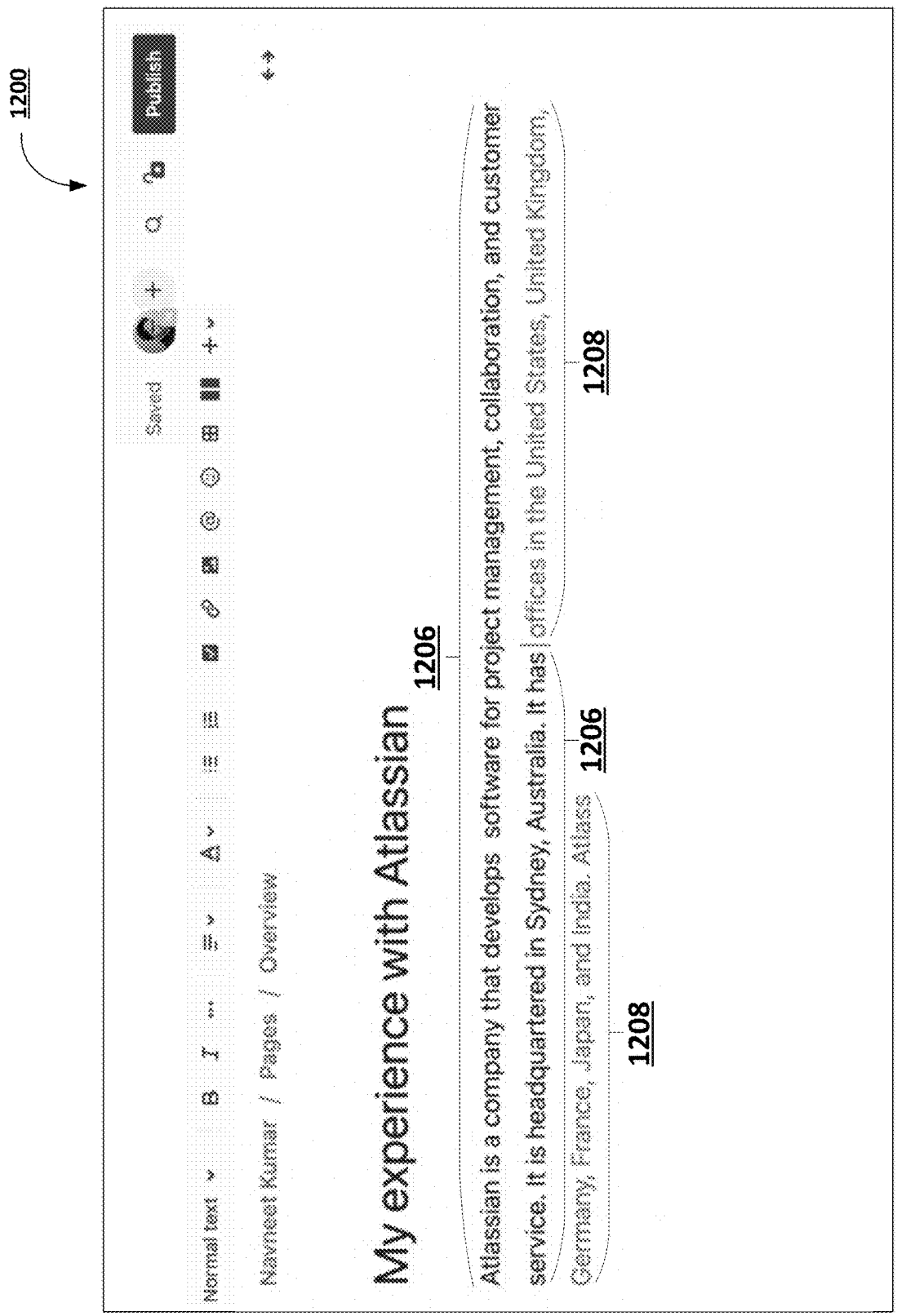

FIGS. 12A-B illustrate an operational example of automatic adaptive digital content generation for a user profile associated with a collaborative document 1200 in accordance with one or more embodiments of the present disclosure. FIG. 12A depicts the collaborative document 1200 with temporally sequenced digital content 1202 generated by a client computing device (e.g., client computing device(s) 102a-n) associated with a user profile related to a document collaboration platform (e.g., document collaboration platform 104). The collaborative document 1200 also depicts suggested adaptive digital content 1204 that was generated by the document assistance system 122 in response to the temporally sequenced digital content 1202.

FIG. 12B depicts the collaborative document 1200 in an updated state after the client computing device associated with the user profile accepted the insertion of the suggested adaptive digital content 1204 such that the suggested adaptive digital content 1204 has been incorporated into the collaborative document 1200. The suggested adaptive digital content 1204 has been incorporated into the collaborative document 1200 and is now rendered on the interactive user interface associated with the collaborative document 1200 as temporally sequenced digital content 1206. The updated state of the collaborative document 1200 also depicts suggested adaptive digital content 1406 that was generated by the document assistance system 122 in response to the temporally sequenced digital content 1206.

FIGS. 13A-C, previously described herein, depict operational examples of automatic adaptive digital content generation associated with distinct user profiles based on temporally sequenced digital content in a collaborative document in accordance with one or more embodiments of the present disclosure.

FIGS. 13A-B illustrate scenarios in which different suggested adaptive digital content can be generated for two separate user profiles based on the same temporally sequenced digital content. For example, both FIGS. 13A and 13B depict temporally sequenced digital content 1302 and 1304 where temporally sequenced digital content 1302 and 1304 are sentence stems directly preceding a dynamic text insertion cursor associated with two distinct user profiles. In this example, dynamic text insertion cursor 1330 is associated with a user profile "Alice," and the user profile Alice is associated with a user profile content corpus reflecting many design-focused documents. Similarly, dynamic text insertion cursor 1332 is associated with a user profile "Bob," and the user profile Bob is associated with a user profile content corpus reflecting many software engineering documents. Both user profiles associated with Alice and Bob have unique stylometric profiles reflective of their respective authoring styles that are employed by document assistance system 122 to generate stylometric model output (e.g., stylometric model output 508) which the document collaboration platform 104 can use to generate suggested adaptive digital content.

For instance, the document collaboration platform 104 generated suggested adaptive digital content 1306 and 1308 for the user profile associated with Alice based on the temporally sequenced digital content 1302 and 1304. The suggested adaptive digital content 1306 and 1308 reflects an authoring style derived from the stylometric profile and user profile content corpus associated with Alice's user profile. In contrast, the document collaboration platform 104 generated suggested adaptive digital content 1310 and 1312 for the user profile associated with Bob based on the temporally sequenced digital content 1302 and 1304. The suggested adaptive digital content 1310 and 1312 reflects an authoring style derived from the stylometric profile and user profile content corpus associated with Bob's user profile.

FIG. 13C illustrates an operational example in which two client computing device(s) 102a-n associated with two respective user profiles (e.g., user profiles associated with "Alice" and "Bob" respectively) are simultaneously generating digital content for a collaborative document. Based on temporally sequenced digital content 1314 related to the user profile associated with Alice, the document assistance system 122 generated stylometric model output (e.g., stylometric model output 508) and the document collaboration platform 104 generated suggested adaptive digital content 1318 based on said stylometric output. The suggested adaptive digital content 1318 has been rendered proximate to the dynamic text insertion cursor 1330 related to the user profile associated with Alice.

As shown in FIG. 13C, the document collaboration platform 104, in conjunction with the document assistance system 122, can generate complementary, concurrent adaptive content for a second user profile (e.g., the user profile associated with Bob) based on the adaptive digital content generated for a first user profile (e.g., the user profile associated with Alice). For example, the suggested adaptive digital content 1318 associated with Alice recites "customer research on good user experience in first milestone." The document assistance system 122 can determine based on the suggested adaptive digital content 1318 and the temporally sequenced digital content 1314 and 1316 comprised in the collaborative document that there has been mention of a "first milestone," and, as such, generates suggested adaptive digital content 1320 for the second user profile associated with Bob which recites "implementation in second milestone."

In this manner, adaptive digital content representing a particular group intent, or a group context, can be generated by the document collaboration platform 104. In scenarios in which the suggested adaptive digital content (e.g., suggested adaptive digital content 1318) for a first user profile (e.g., the user profile associated with Alice) does not comprise any significant context (e.g., such as a first or second "milestone"), the suggested adaptive digital content (e.g., suggested adaptive digital content 1320) for a second user profile (e.g., the user profile associated with Bob) will be based solely on a stylometric profile associated with the second user profile, and therefore the suggested adaptive digital content associated with the second user profile would only reflect the authoring style associated with the second profile and not be directed towards a group context.

Furthermore, FIG. 13C illustrates that the suggested adaptive digital content 1318 generated for the user profile associated with Alice is directed towards a "good user experience," which is representative of the previously described, design-focused user profile content corpus associated with the user profile related to Alice. Additionally, the suggested adaptive digital content 1320 is directed towards an "implementation in second milestone," which is representative of the previously described, software engineering-focused user profile content corpus associated with the user profile related to Bob. Further still, in some embodiments, a stylometric profile generated based on the two user profiles associated with Alice and Bob can be used to stylometrically transform the default model output (e.g., default model output 506) generated by the adaptive digital content processing model(s) 128 such that the stylometric model output (e.g., stylometric model output 508) is representative of a combined authoring style related to the two user profiles associated with Alice and Bob.

Figure 14:
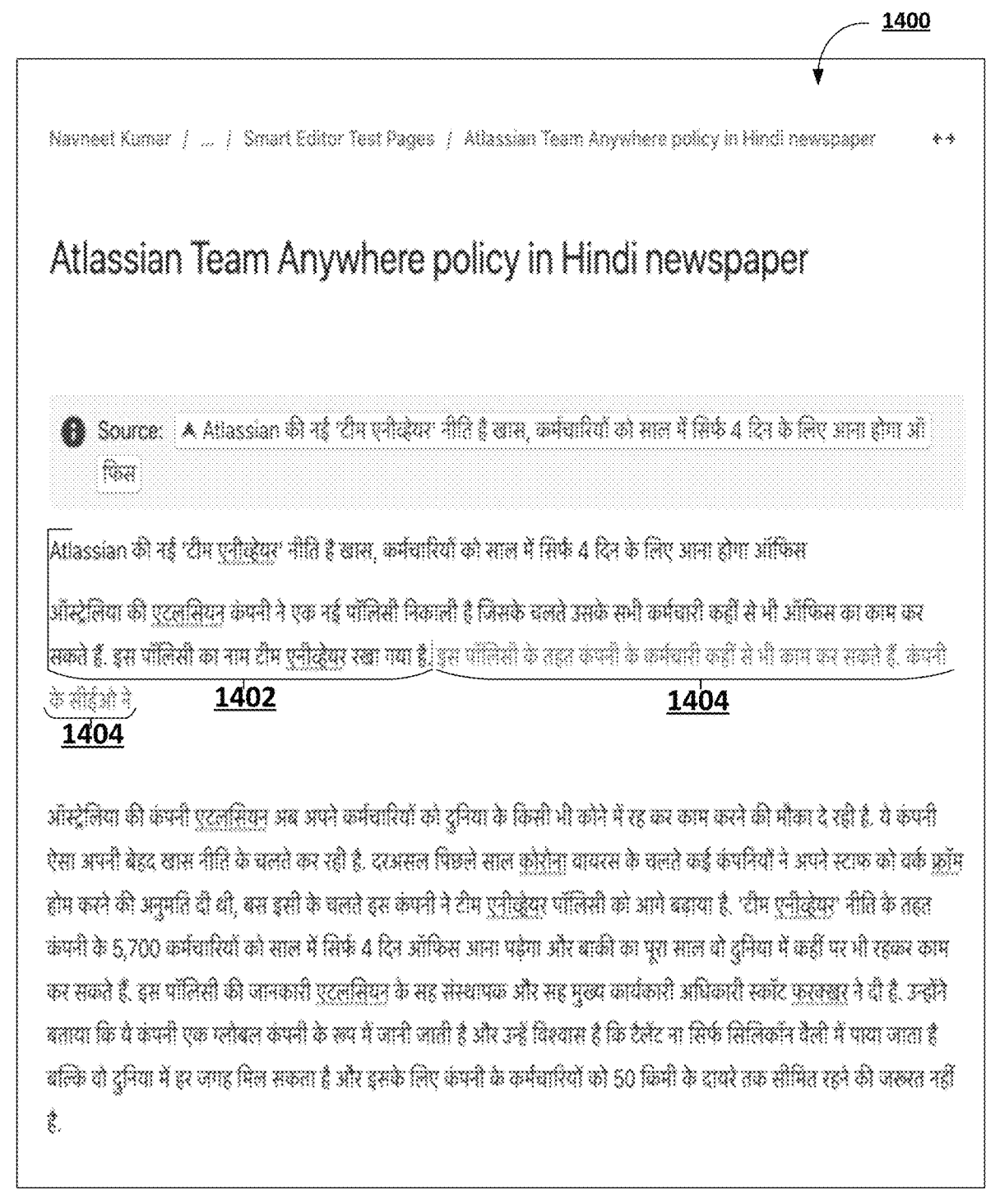

FIG. 14 provides an operational example of automatic adaptive digital content generation related to a specific input language for a collaborative document 1400 in accordance with one or more embodiments of the present disclosure. The document assistance system 122 can comprise one or more adaptive digital content processing model(s) 128 trained on various input languages such as, for example, Hindi, which is depicted in the collaborative document 1400. Furthermore, one or more stylometric profiles associated with one or more respective user profiles associated with a document collaboration platform 104 can be generated based in part on an input language associated with the one or more respective user profiles.

In this regard, the document assistance system 122 can not only generate default model output (e.g., default model output 506) via one or more adaptive digital content processing model(s) 128 trained on various input languages, but the document assistance system 122 can stylometrically transform the default model output based on a unique stylometric profile generated based on a user profile content corpus associated with a particular user profile that repeatedly generates digital content in the respective input language. For example, the collaborative document 1400 depicts temporally sequenced digital content 1402 that has been generated in Hindi via a client computing device (e.g., client computing device 102a) associated with a particular user profile. Suggested adaptive digital content 1404 has been generated by the document assistance system 122 based on the temporally sequenced digital content 1402 and the suggested adaptive digital content 1404 reflects an authoring style associated with the particular user profile associated with the client computing device (e.g., client computing device 102a) generating text for the collaborative document 1400.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus.

Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data.

Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus for automatically generating adaptive digital content for a collaborative document, the apparatus comprising a display, at least one processor, and at least one memory including program code, the at least one memory and the program code configured to, with the at least one processor, cause the apparatus to at least:
   receive user input data associated with the collaborative document, wherein the user input data is generated by a client computing device associated with a user profile identifier, and wherein the user profile identifier is associated with a user profile stored in a data repository related to a document collaboration platform;
   generate, via the document collaboration platform, one or more temporally correlated user input step events based on the user input data;
   render, on one or more interactive user interfaces associated with the collaborative document, temporally sequenced digital content generated based on the one or more temporally correlated user input step events, wherein the temporally sequenced digital content can be associated with the user profile identifier;
   generate suggested adaptive digital content based on model output generated by an adaptive digital content processing model comprised in a document assistance system, wherein the model output is generated based on at least a portion of the temporally sequenced digital content; and render, on the one or more interactive user interfaces associated with the collaborative document, the suggested adaptive digital content.

2. The apparatus of claim 1, wherein the at least one memory and the program code are configured to, with the at least one processor, further cause the apparatus to:

receive a confirmation signal associated with the suggested adaptive digital content, wherein the confirmation signal is generated by the client computing device associated with the user profile identifier, and wherein the confirmation signal comprises an acceptance of the suggested adaptive digital content or a rejection of the suggested adaptive digital content; and in response to receiving a confirmation signal comprising the acceptance of the suggested adaptive digital content:

update the collaborative document to include the suggested adaptive digital content; and store the updated collaborative document in the data repository.

3. The apparatus of claim 1, wherein the one or more temporally correlated user input step events are generated from user input data associated with two or more user profile identifier(s) corresponding to two or more respective client computing devices simultaneously generating digital content for the collaborative document.

4. The apparatus of claim 1, wherein the at least one memory and the program code are configured to, with the at least one processor, further cause the apparatus to:

generate suggested adaptive digital content associated with a first user profile identifier based on temporally sequenced digital content generated based on one or more temporally correlated user input step events associated with a second user profile identifier; and render the suggested adaptive digital content via an interactive user interface associated with the first user profile identifier.

5. The apparatus of claim 1, wherein the at least one memory and the program code are configured to, with the at least one processor, further cause the apparatus to:

generate first suggested adaptive digital content associated with a first user profile identifier based on temporally sequenced digital content comprised in the collaborative document;

generate second suggested adaptive digital content associated with a second user profile identifier based on the first suggested adaptive digital content associated with the first user profile identifier; and render, simultaneously, the first suggested adaptive digital content via a first interactive user interface associated with the first user profile identifier and the second suggested adaptive digital content via a second interactive user interface associated with the second user profile identifier.

6. The apparatus of claim 1, wherein the at least one memory and the program code configured to, with the at least one processor, further cause the apparatus to:

store, via the document collaboration platform, one or more temporally correlated user input step events associated with a user profile identifier, wherein the one or more temporally correlated user input step events are generated based on user input data associated with one or more distinct collaborative documents;

generate one or more user passages based on the one or more temporally correlated user input step events;

associate the one or more user passages with a user profile corresponding to the user profile identifier; and generate a user profile content corpus based on the one or more user passages associated with the user profile.

7. The apparatus of claim 1, wherein the at least one memory and the program code configured to generate the suggested adaptive digital content further cause the apparatus to:

execute a stylometric transformation on the model output generated by the adaptive digital content processing model based on a stylometric profile associated with one or more user profiles stored in the document collaboration platform, wherein the stylometric profile reflects an authoring style associated with the one or more user profiles.

8. The apparatus of claim 7, wherein the stylometric profile is generated based on a stylometric feature set, wherein one or more stylometric features comprised in the stylometric feature set are extracted from one or more user passages comprised in one or more user content corpuses associated with one or more respective user profiles.

9. The apparatus of claim 1, wherein the adaptive digital content processing model comprised in the document assistance system can be trained based in part on one or more collaborative documents stored by a particular document collaboration platform, wherein the one or more collaborative documents comprise one or more user passages associated with one or more respective user profiles, wherein the one or more respective user profiles are associated with the particular document collaboration platform, and wherein model output generated by the adaptive digital content processing model trained based in part on the one or more collaborative documents reflects an enterprise authoring style related to the particular document collaboration platform.

10. The apparatus of claim 1, wherein the temporally sequenced digital content can be associated with one or more input languages, wherein the suggested adaptive digital content is generated based on model output generated by an adaptive digital content processing model trained on a respective language of the one or more input languages.

11. A computer-implemented method for automatically generating adaptive digital content for a collaborative document, the method comprising:

receiving user input data associated with the collaborative document, wherein the user input data is generated by a client computing device associated with a user profile identifier, and wherein the user profile identifier is associated with a user profile stored in a data repository related to a document collaboration platform;

generating, via the document collaboration platform, one or more temporally correlated user input step events based on the user input data;

rendering, on one or more interactive user interfaces associated with the collaborative document, temporally sequenced digital content generated based on the one or more temporally correlated user input step events, wherein the temporally sequenced digital content can be associated with the user profile identifier;

generating suggested adaptive digital content based on model output generated by an adaptive digital content processing model comprised in a document assistance system, wherein the model output is generated based on at least a portion of the temporally sequenced digital content; and rendering, on the one or more interactive user interfaces associated with the collaborative document, the suggested adaptive digital content.

12. The computer-implemented method of claim 11, the method further comprising:
receiving a confirmation signal associated with the suggested adaptive digital content, wherein the confirmation signal is generated by the client computing device associated with the user profile identifier, and wherein the confirmation signal comprises an acceptance of the suggested adaptive digital content or a rejection of the suggested adaptive digital content; and
in response to receiving a confirmation signal comprising the acceptance of the suggested adaptive digital content:
updating the collaborative document to include the suggested adaptive digital content; and
storing the updated collaborative document in the data repository.

13. The computer-implemented method of claim 11, the method further comprising:
generating suggested adaptive digital content associated with a first user profile identifier based on temporally sequenced digital content generated based on one or more temporally correlated user input step events associated with a second user profile identifier; and
rendering the suggested adaptive digital content via an interactive user interface associated with the first user profile identifier.

14. The computer-implemented method of claim 11, the method further comprising:
generating first suggested adaptive digital content associated with a first user profile identifier based on temporally sequenced digital content comprised in the collaborative document;
generating second suggested adaptive digital content associated with a second user profile identifier based on the first suggested adaptive digital content associated with the first user profile identifier; and
rendering, simultaneously, the first suggested adaptive digital content via a first interactive user interface associated with the first user profile identifier and the second suggested adaptive digital content via a second interactive user interface associated with the second user profile identifier.

15. The computer-implemented method of claim 11, the method further comprising:
storing, via the document collaboration platform, one or more temporally correlated user input step events associated with a user profile identifier, wherein the one or more temporally correlated user input step events are generated based on user input data associated with one or more distinct collaborative documents;
generating one or more user passages based on the one or more temporally correlated user input step events;
associating the one or more user passages with a user profile corresponding to the user profile identifier; and
generating a user profile content corpus based on the one or more user passages associated with the user profile.

16. The computer-implemented method of claim 11, wherein generating the suggested adaptive digital content further comprises:
executing a stylometric transformation on the model output generated by the adaptive digital content processing model based on a stylometric profile associated with one or more user profiles stored in the document collaboration platform, wherein the stylometric profile reflects an authoring style associated with the one or more user profiles.

17. A non-transitory computer-readable storage medium for automatically generating adaptive digital content for a collaborative document, the non-transitory computer-readable storage medium including instructions that when executed by at least one processor, cause the at least one processor to:
receive user input data associated with the collaborative document, wherein the user input data is generated by a client computing device associated with a user profile identifier, and wherein the user profile identifier is associated with a user profile stored in a data repository related to a document collaboration platform;
generate, via the document collaboration platform, one or more temporally correlated user input step events based on the user input data;
render, on one or more interactive user interfaces associated with the collaborative document, temporally sequenced digital content generated based on the one or more temporally correlated user input step events, wherein the temporally sequenced digital content can be associated with the user profile identifier;
generate suggested adaptive digital content based on model output generated by an adaptive digital content processing model comprised in a document assistance system, wherein the model output is generated based on at least a portion of the temporally sequenced digital content; and
render, on the one or more interactive user interfaces associated with the collaborative document, the suggested adaptive digital content.

18. The non-transitory computer-readable storage medium of claim 17, wherein the instructions further cause the at least one processor to:
receive a confirmation signal associated with the suggested adaptive digital content, wherein the confirmation signal is generated by the client computing device associated with the user profile identifier, and wherein the confirmation signal comprises an acceptance of the suggested adaptive digital content or a rejection of the suggested adaptive digital content; and
in response to receiving a confirmation signal comprising the acceptance of the suggested adaptive digital content:
update the collaborative document to include the suggested adaptive digital content; and
store the updated collaborative document in the data repository.

19. The non-transitory computer-readable storage medium of claim 17, wherein the instructions further cause the at least one processor to:
generate suggested adaptive digital content associated with a first user profile identifier based on temporally sequenced digital content generated based on one or more temporally correlated user input step events associated with a second user profile identifier; and
render the suggested adaptive digital content via an interactive user interface associated with the first user profile identifier.

20. The non-transitory computer-readable storage medium of claim 17, wherein the instructions further cause the at least one processor to:

generate first suggested adaptive digital content associated with a first user profile identifier based on temporally sequenced digital content comprised in the collaborative document;
generate second suggested adaptive digital content associated with a second user profile identifier based on the first suggested adaptive digital content associated with the first user profile identifier; and
render, simultaneously, the first suggested adaptive digital content via a first interactive user interface associated with the first user profile identifier and the second suggested adaptive digital content via a second interactive user interface associated with the second user profile identifier.

* * * * *